US010334016B2

(12) United States Patent
Wei et al.

(10) Patent No.: US 10,334,016 B2
(45) Date of Patent: *Jun. 25, 2019

(54) SYSTEM AND METHOD FOR CONTEXT SPECIFIC WEBSITE OPTIMIZATION

(71) Applicant: Yottaa Inc., Waltham, MA (US)

(72) Inventors: Coach Wei, Waltham, MA (US); Raymond Stata, Dover, MA (US)

(73) Assignee: Yottaa Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,171

(22) Filed: May 26, 2017

(65) Prior Publication Data

US 2017/0264701 A1 Sep. 14, 2017

Related U.S. Application Data

(63) Continuation of application No. 13/633,240, filed on Oct. 2, 2012, now Pat. No. 9,674,258.

(60) Provisional application No. 61/602,173, filed on Feb. 23, 2012.

(51) Int. Cl.
*H04L 29/08* (2006.01)

(52) U.S. Cl.
CPC ........ *H04L 67/02* (2013.01); *H04L 29/08864* (2013.01); *H04L 67/2814* (2013.01)

(58) Field of Classification Search
CPC ................ H04L 67/2814; H04L 67/02; H04L 29/08864
USPC .................................................. 709/224, 219
See application file for complete search history.

(56) References Cited

U.S. PATENT DOCUMENTS

| 6,633,912 | B1 | 10/2003 | Welter et al. |
| 6,973,490 | B1 | 12/2005 | Robertson et al. |
| 7,353,272 | B2 | 4/2008 | Robertson et al. |
| 7,464,187 | B2 | 12/2008 | Glommen et al. |
| 7,676,574 | B2 | 3/2010 | Glommen et al. |
| 7,757,175 | B2 | 7/2010 | Miller |

(Continued)

OTHER PUBLICATIONS

Extended European Search Report on 12869124.3 dated Nov. 12, 2015.

(Continued)

*Primary Examiner* — Philip B Tran
(74) *Attorney, Agent, or Firm* — Foley & Lardner LLP

(57) ABSTRACT

A system for optimizing a website for different contexts includes an intermediary component configured to connect to clients and servers via network connections, means for analyzing a HTTP request from a client and determining specific context of the HTTP request, means for configuring optimization settings of selected website properties for the specific context of the HTTP request, and means for applying the configured context-specific optimization settings to redirected HTTP requests and HTTP responses. The intermediary component includes a traffic management system (TMS) and a traffic processing system (TPS). The TMS manages HTTP requests originating from the clients and targeting the servers and HTTP responses targeting the clients and redirects the HTTP requests to the intermediary component. The TPS receives the redirected HTTP requests and the HTTP responses, detects the context and applies relevant optimization techniques for the specific context to the redirected HTTP requests and the HTTP responses.

20 Claims, 28 Drawing Sheets

(56) References Cited

U.S. PATENT DOCUMENTS

| | | |
|---|---|---|
| 8,069,075 B2 | 11/2011 | Santos et al. |
| 8,112,471 B2 * | 2/2012 | Wei et al. |
| 9,674,258 B2 * | 6/2017 | Wei .................. H04L 67/02 |
| 2003/0131106 A1 | 7/2003 | Kasriel |
| 2007/0208686 A1 | 9/2007 | Gupta et al. |
| 2009/0030859 A1 | 1/2009 | Buchs et al. |
| 2009/0077112 A1 | 3/2009 | Albrecht et al. |
| 2009/0265681 A1 | 10/2009 | Beto et al. |
| 2009/0270076 A1 | 10/2009 | Zhou et al. |
| 2009/0276488 A1 | 11/2009 | Alstad |
| 2011/0099294 A1 | 4/2011 | Kapur et al. |
| 2011/0137973 A1 | 6/2011 | Wei et al. |
| 2011/0208920 A1 | 8/2011 | Betancourt et al. |

OTHER PUBLICATIONS

International Preliminary Report on Patentability on PCT/US2012/058528 dated Aug. 26, 2014.
International Search Report and Written Opinion on PCT/US2012/058528 dated Mar. 29, 2013.
US Notice of Allowance on U.S. Appl. No. 13/633,240 dated Jan. 30, 2017.
US Office Action on U.S. Appl. No. 13/633,240 dated Aug. 11, 2016.
US Office Action on U.S. Appl. No. 13/633,240 dated Nov. 19, 2015.

* cited by examiner

What would you like to test? | Test Options | Advanced last mile connectivity [T3/T1 (15mb/sec up stream, 150mb/sec] ▼

406 browser:
- ☐ Internet Explorer 7.0
- ☑ Internet Explorer 8.0
- ☐ Internet Explorer 9.0
- ☐ Firefox 4.0
- ☐ Chrome 10.0
- ☐ Safari location:

North America:
- ● Washington DC (DC)
- ○ San Francisco (SFO)
- ○ Boston (BOS)
- ○ New York City (NYC)
- ○ Chicago (CRD)
- ○ Miami (MIA)
- ○ Seattle (SEA)

Europe:
- ○ London
- ○ Paris
- ○ Frankfurt
- ○ Madrid
- ○ Moscow
- ○ Stockholm

Asia:
- ○ Singapore
- ○ HongKong
- ○ Tokyo
- ○ Shanghai
- ○ Beijing
- ○ Chengdu
- ○ Xian Others:
- ○ Tel Aviv
- ○ Sydney
- ○ San Paul
- ○ Shanghai
- ○ Beijing
- ○ Chengdu
- ○ Xian

Rule conditions - when the above action should be applied?

| | | | |
|---|---|---|---|
| ☒ Resource URL | must match | www.mysite1.com/path/my.js | |
| ☒ Page URL | must match | www.mysite1.com/home.html | |
| ☒ Client user agent | must match | IE8 | |
| ☐ Request header contains field | whose name matches | | |
| | whose value does not match | | |
| ☐ Response header contains field | whose name matches | | |
| | with any value | | |

SYSTEM AND METHOD FOR CONTEXT SPECIFIC WEBSITE OPTIMIZATION

CROSS-REFERENCE TO RELATED PATENT APPLICATION

The present application is a continuation of and claims priority to U.S. patent application Ser. No. 13/633,240, entitled "SYSTEM AND METHOD FOR CONTEXT SPECIFIC WEBSITE OPTIMIZATION", filed Oct. 2, 2012 which in turn claims priority to provisional patent application 61/602,173, entitled "SYSTEM AND METHOD FOR CONTEXT SPECIFIC WEBSITE OPTIMIZATION", filed Feb. 23, 2012, all of which are incorporated herein by reference in their entirety.

FIELD OF THE INVENTION

The present invention relates to a system and a method for context specific website optimization, and in particular, to context specific optimization of a website for achieving optimal results for different contexts including different browsers, different network connectivity, different client settings, different mobile devices, different security conditions and different search engines.

BACKGROUND OF THE INVENTION

Every day, millions of people visit various websites for learning, reading, sharing, social networking, shopping, blogging, gaming, dating, dining and travel, among others. At the same time, millions of websites are trying to be successful in serving their objectives, whether it is to build an online business, support an offline business, or both. According to NetCraft, there are over 68,000,000 active websites as of March 2009, with over 1,400,000 new websites created every month for the last 15 years. While each website serves its own purpose, together they form part of the foundation of our society today.

Websites are visited in many different contexts. To a large degree, the success or failure of a website depends on how well the website responds to requests in these contexts. Some of these contexts include web browser type, client device type, mobile device type, network connection, security and search engine bot.

A web visitor (user) visits a website using a web browser. There are many different web browsers such as Internet Explorer, Mozilla Firefox, Google Chrome and Apple Safari.

Each browser has many different versions. The user experience of the website on different browsers will be different. Some may work better than others, making the site more successful on some browsers than others.

A web visitor may visit a website using a mobile device such as an Apple iPhone, Apple iPad or an Android Tablet. The user experience of the website on these different devices are going to be different. Again, some may work better than others, making the site more successful on some browsers than others.

A web visitor may visit a website from different network connections, such as cable modem, DSL, wireless, T1, among others. Different network connectivity has different characteristics. Some are slow and have low bandwidth. Web pages with low graphics and simpler designs can deliver the best experience. Some have high bandwidth and fast speed, through which a highly visual rich interactive experience including video, audio and images can be delivered to achieve an engaging experience. If the website isn't smart about making proper tradeoffs, it may deliver a bad experience and fail.

A malicious hacker or a malicious program may attack the website. In this context, the severity of the attack and the capability for defense are going to determine whether the website can continue to function and serve its purpose.

A search engine bot crawls pages on the website. Search engines include Google bots, Microsoft Bing bots, Baidu bots, Ask.com bots, among others. The more pages these bots crawl, the more keywords these bots can index, the better search visibility this website will have. So in this context, the better a website can interact with these bots, the more search visibility the site will have and thus will be more successful.

No matter what the context is, the performance of a website directly impacts its success or failure in serving its objective. When a website is slow, users have to spend more time waiting and become less productive. More often, they lose patience, abandon their activities and leave. Further, users are much less likely to come back to slower websites. On the contrary, faster performance results in more pleasant user experience. Users are more productive and are more likely to come back.

The impact of web performance on business success has been demonstrated many times in the real world. The following is a partial list of web performance problems:
  Amazon: 100 ms delay caused a 1% drop in revenue.
  Google: 400 ms delay caused a 0.59% decrease in search requests per user
  Yahoo!: 400 ms delay caused a 5-9% decrease in traffic.
  Bing: 2 seconds delay caused a 4.3% drop in revenue per user.
  Mozilla made their download page 2.2 seconds faster and was rewarded with an increase of 15.4% in downloads.
  Google Maps reduced the file volume by 30% and observed a 30% increase in map requests.
  Netflix enabled gzip on the server; simply by this single action pages became 13-25% faster and saved 50% of traffic volume!
  Shopzilla succeeded in reducing the loading time from 7 down to 2 seconds, whereby the conversion rate increased by 7-12%, they observed a 25% increase in page requests, they were able to retire 50% of their servers, thus saving energy costs.
  AOL observed the number of page views on several websites. While the fastest users requested 7-8 pages, the slowest only viewed 3-4.

Since the beginning of the web, website owners have been trying to find ways to improve their website performance. First, it is relevant to look at the factors that influence website performance.

The performance of a website is determined by a complex chain of elements along the web application delivery chain, starting from the data center where the website is running to the end user's browser.

When a user requests a web page, the user's browser sends out the request as an HTTP request. The HTTP request is transmitted from the user's computer to the user's last mile connectivity, which can be dial-up, DSL, Cable modem, wifi, cellular, T1, T3, among others, to some local Internet Service Provider (ISP). The request is further transmitted from the local ISP to some other ISP networks according to the Internet's routing protocols (BGP). Along the path, there may be firewalls, network gateways, filters, address translations, among others, at each hop that the request passes through. If there is no error, eventually the request reaches the data center where the website is running. Inside the data center, an HTTP server processes the request, which may go through a few additional steps such as invoking some middleware logic and database lookups, and eventually produces an HTML document. The HTTP server returns the HTML document in response to the HTTP request. The HTML document is transmitted as an HTTP response message, traversing a similar network path along the chain, until eventually the HTTP response is received by the user's browser. The browser parses the HTTP response, interprets it and processes it. Once the browser recognizes the HTTP response is an HTML document, it starts to render the HTML document. Along the way of rendering, if the HTML page contains additional resources such as images, JavaScript files, cascade style sheet (CSS) files, media files, among others, the browser issues additional requests for these resources. Each request results in one round trip. It is fairly typical for today's web pages to require over 100 round trips. Eventually all these resources are loaded, the browser fully renders the page and the web page is ready for user interaction.

The various components that impact website performance along the delivery path can be classified into the following categories:

1. Factors related to web content complexity: the size of the HTML page, the number of additional round trip requests required by the page, Javascript files, CSS files, image files, video or other media files, third party widgets on the pages, among others. A more complex webpage may require more browser processing time and may also result in more number of round trips, which can require a longer wait time.
2. Client side factors: these include the browser itself, the speed of the client machine or device, and the performance of browser processing, among others.
3. Network related factors: the last mile connectivity, the network path and number of hops along the path from the client browser to reach a target HTTP server, network congestion conditions, latency, geographic distance, firewall and filtering along the network path, routing algorithms employed by the various hops along the path, network protocols and their efficiency, packet drop rate, among others
4. Server infrastructure related factors: the geographic locations of the HTTP servers, the number of HTTP servers and the performance of each server, the performance of other server side infrastructure required to fulfill HTTP requests, among others There are various approaches for optimizing website performance. Different approaches focus on different influence factors. The following lists these approaches:

1. Hire a smart web development team to optimize web content. Big websites typically employ this approach because they have the resources to find and engage the required technical talents. However, such talents are scarce and expensive. Most of the websites neither have the resources or bandwidth to do so. Google.com is a good example. The home page of Google.com, including The HTML code, Javascript, CSS files and images files, is highly optimized for fastest performance. It delivers great results but requires some of the best engineers on the planet to do so.
2. Build server infrastructure by adding more data centers to improve geographic coverage and redundancy or adding more hardware gears to improve the processing capacity, among others. Big websites typically employ many HTTP servers and use load balancing to distribute load to these HTTP servers. Some of them even built multiple data centers located in different geographic regions to reduce the impact of geographic latency. This approach requires not only substantial amount of infrastructure investments, but also requires significant technical talents to operate and manage these infrastructure operations. As a result, most websites that do not have the financial resources as these big websites have only limited options.
3. Use a Content Delivery Network (CDN): Content delivery network (CDN) is a network service that distributes static web assets to the edge of the Internet and serves them from locations that are geographically closer to the end user to improve the performance of webpage loading. There are many CDN services available to choose from, including vendors such as Akamai, LimeLight, Amazon CloudFront, EdgeCast, HighWinds, CDNetworks, ChinaCache, Cotendo, NetDNA/MaxCDN, SimpleCDN, ATT CDN, BigGravity, Advection.NET, Bitorrent, CacheFly, Velocix, Digital Foundation, GridNetworks, Ignite Technologies, Internap, Level 3 Communications, Mirror Image, Move Networks, NaviSite, Pando Networks, PEER1, SoftLayer CDN, Microsoft, Swarmcast, Tata Communications, or Voxel.net, among others. CDN is particularly useful for video streaming or large static asset distribution. To use a CDN service, a website needs to separate the static assets and upload them to the CDN, and then distribute the assets from the CDN. Traditionally CDN services were mostly used by big web properties as they have the required financial and technical resources to do so. Over the recent years, smaller but technically sophisticated websites started to adopt CDN services as well.
4. Use specialized network gears, such as Application Delivery Controller (ADC) and TCP/IP optimization gears. Many networking vendors including Cisco, Citrix, Bluecoat, and F5 Networks provide ADC devices that website owners can purchase and install to improve the performance of HTTP connection processing. These devices typically offer load balancing, caching, connection pooling, or even protocol optimization. These are widely adopted by large commercial websites. They are powerful but expensive, requiring not only significant upfront investment, but also ongoing maintenance and support.

Another approach is to optimize the client side browser performance. Different browsers have different strength. It is possible to exploit the unique strength of a particular browser to build a higher performing website. In fact, some websites do require a specific browser or browser version in order to perform. However, this is not a suitable approach for most websites because websites rarely have control on the client side user environment.

The current technology landscape for website optimization is complex with hundreds of factors involved. Each of the above mentioned approaches addresses only a small portion of these factors. To effectively optimize the performance of a website, significant technical know-how is required. It is a tedious and manual process that requires continued investment in order to yield results. In reality, most websites do not have the technical know-how, or the financial resources, to make such commitments. For these websites that do have the financial resources, they typically have to employ a large technical team, with skills covering both web development and network operations, to continuously evaluate the various techniques, experiment with them, monitor the results and iterate.

In summary, prior art web optimization approaches are complex, expensive, manual and are only affordable by large web properties. Accordingly, there is a need for a system and a method that provides better website optimization solutions that can deliver optimal results in different contexts.

SUMMARY OF THE INVENTION

In general, in one aspect, the invention features a system for optimizing a website for different contexts. The website runs on one or more HTTP servers and is configured to receive HTTP requests from one or more clients and to provide HTTP responses. The system includes an intermediary component configured to connect to the clients and the servers via network connections. The intermediary component includes a traffic management system (TMS) and a traffic processing system (TPS). The TMS manages HTTP requests originating from the clients and targeting the servers and HTTP responses targeting the clients and redirects the HTTP requests to the intermediary component. The TPS receives the redirected HTTP requests and the HTTP responses and applies optimization techniques to the redirected HTTP requests and the HTTP responses. The system further includes means for analyzing a HTTP request from a client and determining the specific context of the HTTP request, means for tuning optimization settings of selected website properties for the specific context of the HTTP request, and means for applying the configured context-specific optimization settings to the redirected HTTP requests and HTTP responses.

Implementations of this aspect of the invention may include one or more of the following features. The specific context may be one of browser type, client device type, mobile device type, search engine type, network type, or bot type. The specific context may be one or more of HTTP request parameters, cookies, HTTP secure (HTTPS), client IP address, client locale, port number, screen size or screen resolution. The means for configuring optimization settings of selected website properties for a specific context may be a customizing user interface or an application programming interface (API). The system may further include means for testing website properties against specific optimization objectives and producing test results. The system may further include means for visualizing the produced test results, and enabling actions for tuning optimization settings from the produced test results. The website properties may be website performance, website security, website search engine ranking, or website user experience on mobile devices. The means for testing is configured to perform real browser testing, web transaction testing, HTTP/API testing and mobile device testing. The means for testing is configured to perform the testing only once, multiple times, or according to a schedule. The visualized test results may include one or more of front-end experience, back-end performance, content complexity, webpage load timeline, HTTP request timeline, HTTP response timeline, HTTP request headers, HTTP response headers, results by geography, results by browser type, results by last mile connectivity, data samples, overall test score or specific tests results. The HTTP request timeline, the HTTP response timeline, and the webpage load timeline are displayed as waterfall diagrams. The optimization settings for the website security may include one or more of visitor blacklisting and blocking, visit rate throttling, downtime protection, fail whale protection, form attack prevention, content security policy, security scanner, distributed denial of service (DDOS) attack prevention, robot blocking, login protection, or attack dashboard. The optimization settings for website search engine optimization include one or more of accelerating webpage delivery to a search engine, finding and reporting search engine optimization (SEO) problems, search engine reporting, website error reporting and auto-correction, or automatic management of website map. The optimization settings for optimizing website user experience on mobile devices includes one or more of selecting a different set of rules for different type of mobile devices, applying transformation rules to transform a webpage into a transcoded webpage that is suitable for a specific mobile device, applying caching rules to cache the webpage and assets that are suitable for a specific mobile device and delivering the transcoded webpage and assets to a specific mobile device. The rules include pre-defined rules and custom rules. The set of rules include rules of how to speed up a webpage, and how to transform a webpage so that it fits better within a mobile device's screen. The webpage transformation rules include one or more of transcode images, compress images, insert JavaScript files for improved mobile interactivity, insert Javascript code for accessing HTML 5 local storage, exclude selected resources such as images, CSS files or Javascript files, reformat HTML pages for better viewing experience on mobile devices, select certain content blocks from the webpage, reformat them into a new webpage layout as specified in the transformation rule, select certain content blocks from the webpage, mash them up with content and data from other sources such as external websites or data feed, format them into a new webpage layout customized for the mobile device, redirect to a mobile specific URL or display a pre-defined page. The means for analyzing an HTTP request is configured to analyze an HTTP request from a specific mobile device and to determine mobile device profile, mobile device screen resolution, mobile device capability, browser profile, HTML local storage capability and network connectivity. The means for analyzing an HTTP request is further configured to check if a suitable webpage for the specific mobile device exists and if a suitable webpage exists to serve the webpage directly, and if a suitable webpage does not exist to send a request to the website. The optimization settings for optimizing the website performance include browser optimization, content optimization, HTTP optimization, network optimization, content delivery network (CDN) optimization, and infrastructure optimization.

In general, in another aspect, the invention features a method for optimizing a website for different contexts. The website runs on one or more HTTP servers and is configured to receive HTTP requests from one or more clients and to provide HTTP responses. The method includes providing an intermediary component configured to connect to the clients and the servers via network connections. The intermediary component includes a traffic management method (TMS) and a traffic processing method (TPS). The TMS manages HTTP requests originating from the clients and targeting the servers and HTTP responses targeting the clients and redirects the HTTP requests to the intermediary component. The TPS receives the redirected HTTP requests and the HTTP responses and applies optimization techniques to the redirected HTTP requests and the HTTP responses. The method further includes analyzing an HTTP request from a client and determining specific context of the HTTP request, configuring optimization settings of selected website properties for the specific context of the HTTP request and applying the configured context-specific optimization settings to the redirected HTTP requests and HTTP responses.

In general, in another aspect, the invention features a system for providing context specific optimization of a website including a testing component, a visualizing component, and an optimizing component. The testing component is configured to test and measure website properties against specific optimization objectives and to produce test results. The visualizing component is configured to visualize the test results, and enable actions for tuning optimization settings from the produced test results. The optimizing component is configured to configure and apply context specific optimization settings to the website properties. The system after applying the context specific optimization settings to the website properties, it repeats the context specific optimization of the website iteratively by repeating the testing, visualizing the test results and configuring and applying new optimization settings.

In general, in another aspect, the invention features an iterative process for optimizing a website including setting up initial optimization settings for a website, testing the website and capturing the test results, visualizing the test results, configuring new optimization settings and applying the new optimization settings to the website and repeating the testing, visualizing and configuring and applying of new optimization settings until a desired optimization result is achieved.

In general, in another aspect, the invention features a customizing user interface (CUI) for providing context specific optimization of a website including a testing component for testing and measuring website properties against specific optimization objectives and producing test results, a visualizing component for visualizing and analyzing the test results and an optimizing component for configuring and applying optimization settings to website properties. The CUI after applying the optimization settings, it allows a user to repeat the testing, visualizing, configuring and applying steps of the context specific optimization process iteratively.

In general, in another aspect, the invention features a system for adding resources to a webpage or removing resources from a webpage including a traffic processing system (TPS) with configurable processing settings, and a traffic management system (TMS) for directing HTTP requests to the TPS. The TPS receives an HTTP request from a client and processes an HTTP response to the HTTP request according to processing settings and context data related to the HTTP request by conditionally inserting a resource into the HTTP response or removing an existing resource from the HTTP response and then returns the HTTP response to the client. The resource may be one or more of a Javascript code snippet, a web widget, an HTML code snippet, an image, an Adobe Flash video, or a third party tag. The processing settings may be one or more of service level agreement (SLA) settings, security related settings, or geography related settings.

In general, in another aspect, the invention features a method for changing and testing website optimization settings including differentiating a first website test session among a group of website sessions, maintaining first optimization settings for the first website test session, maintaining live optimization settings for the group of website sessions, saving website optimization changes made during the first website testing session only to the first optimization settings, applying the first optimization settings to the first website test session, and applying live optimization settings to the group website sessions. The first website test session is differentiated among a group of website sessions by setting up a test session specific cookie for the first website test session. The test session specific cookie is set up by running a special test startup webpage. The first website test session is differentiated among a group of website sessions by specifying a specific IP address for the first website test session.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

FIG. 7 depicts a tester screen for selecting the test options for testing the selected function of FIG. 6;

FIG. 8 depicts a tester screen for selecting advanced test options for testing the selected function of FIG. 6;

FIG. 9 depicts a visualizer screen with the webpage test results from testing the selected function of FIG. 6;

FIG. 14B shows an enlarged view of a portion of the waterfall diagram of FIG. 14A;

FIG. 16 depicts a user interface (UI) for configuring rule conditions for the iterative web optimization process of FIG. 3B;

Figure 17:
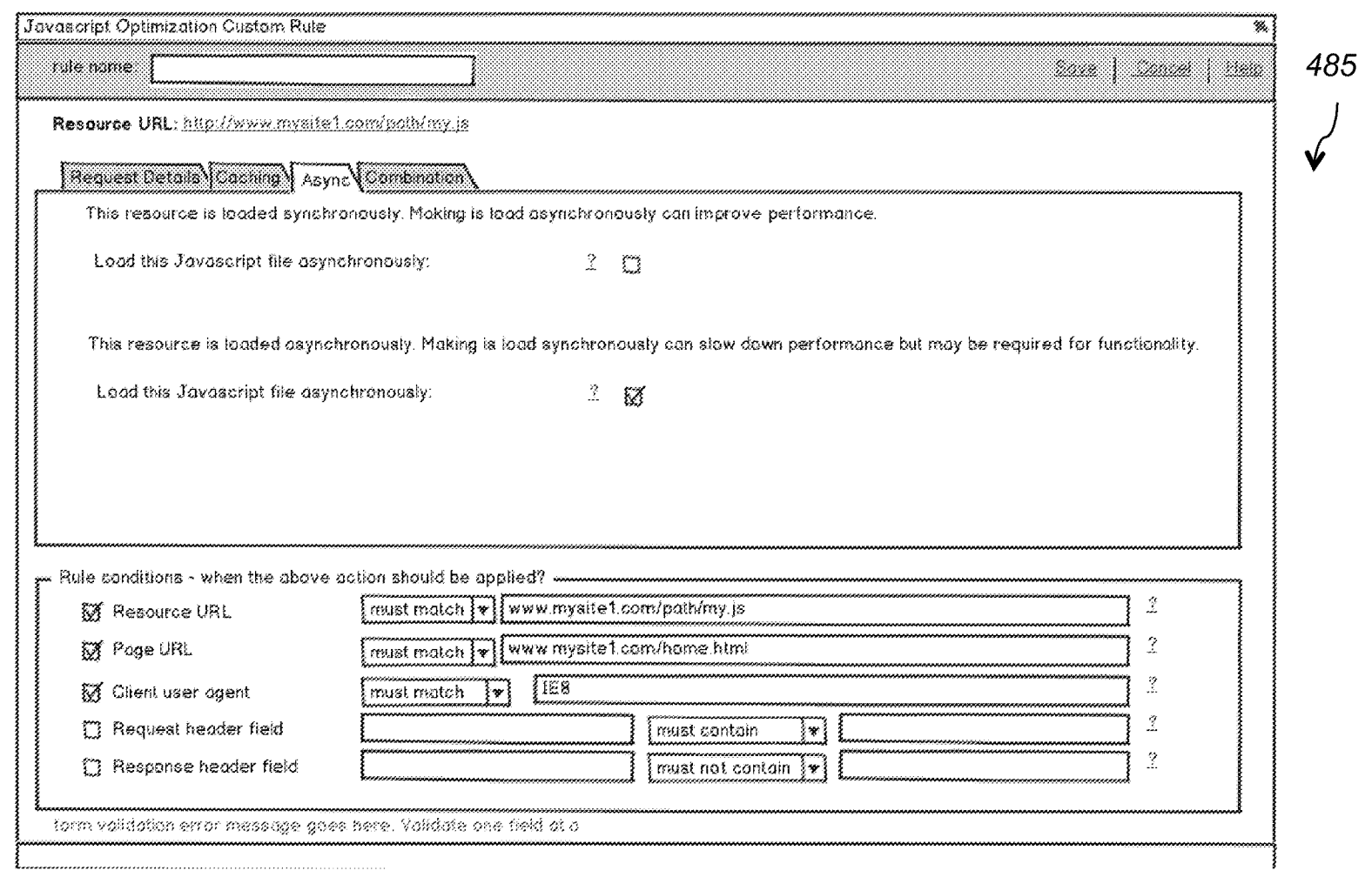

FIG. 17 depicts a UI for specifying parameters for JavaScript optimization via asynchronously loading;

FIG. 19 depicts a UI for selecting parameters for JavaScript optimization via JavaScript combination;

Figures 20, 21:
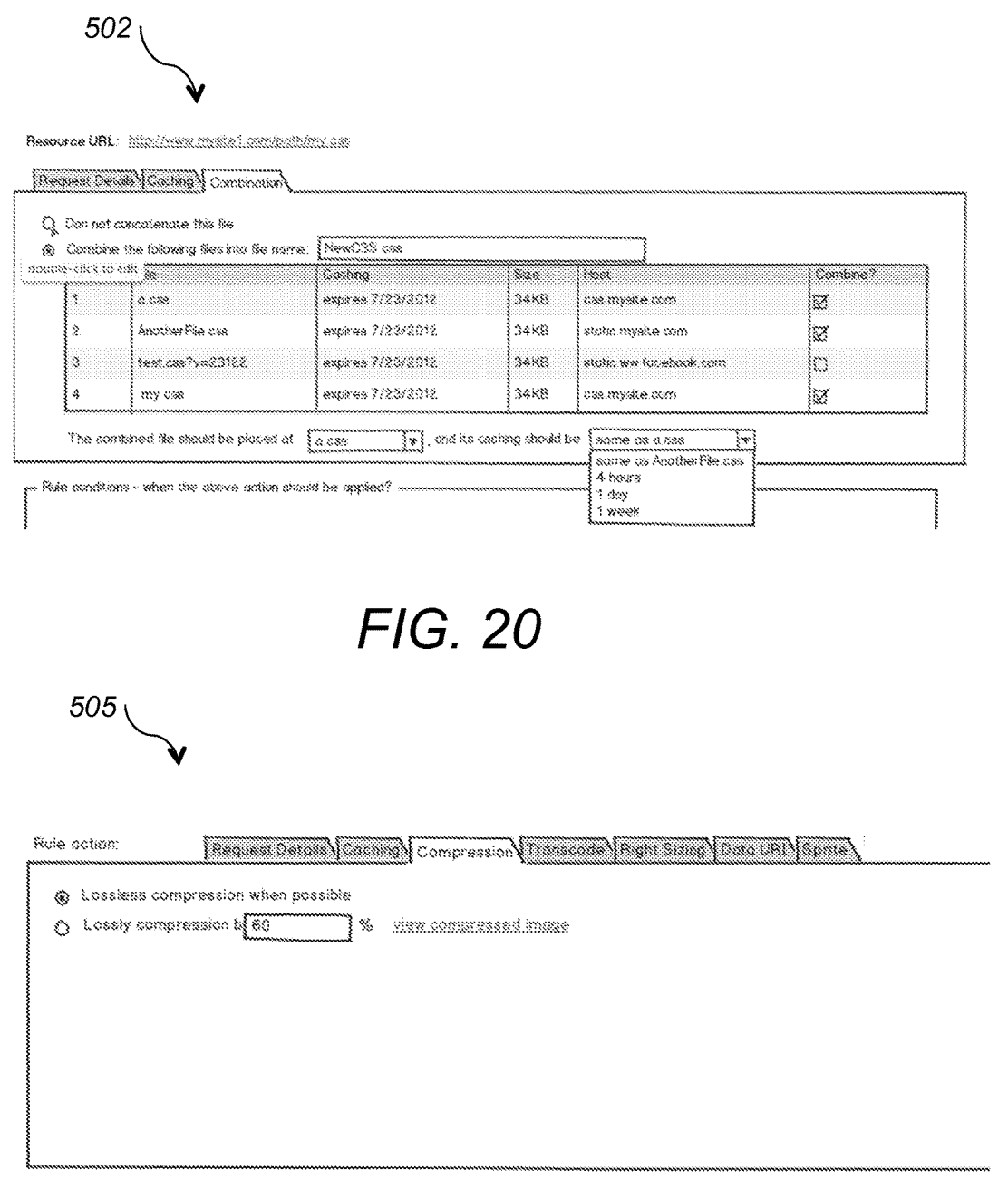

FIG. 20 depicts a UI for selecting parameters for CSS optimization via CSS combination;

FIG. 21 depicts a UI for selecting parameters for image optimization via compression;

Figure 25:
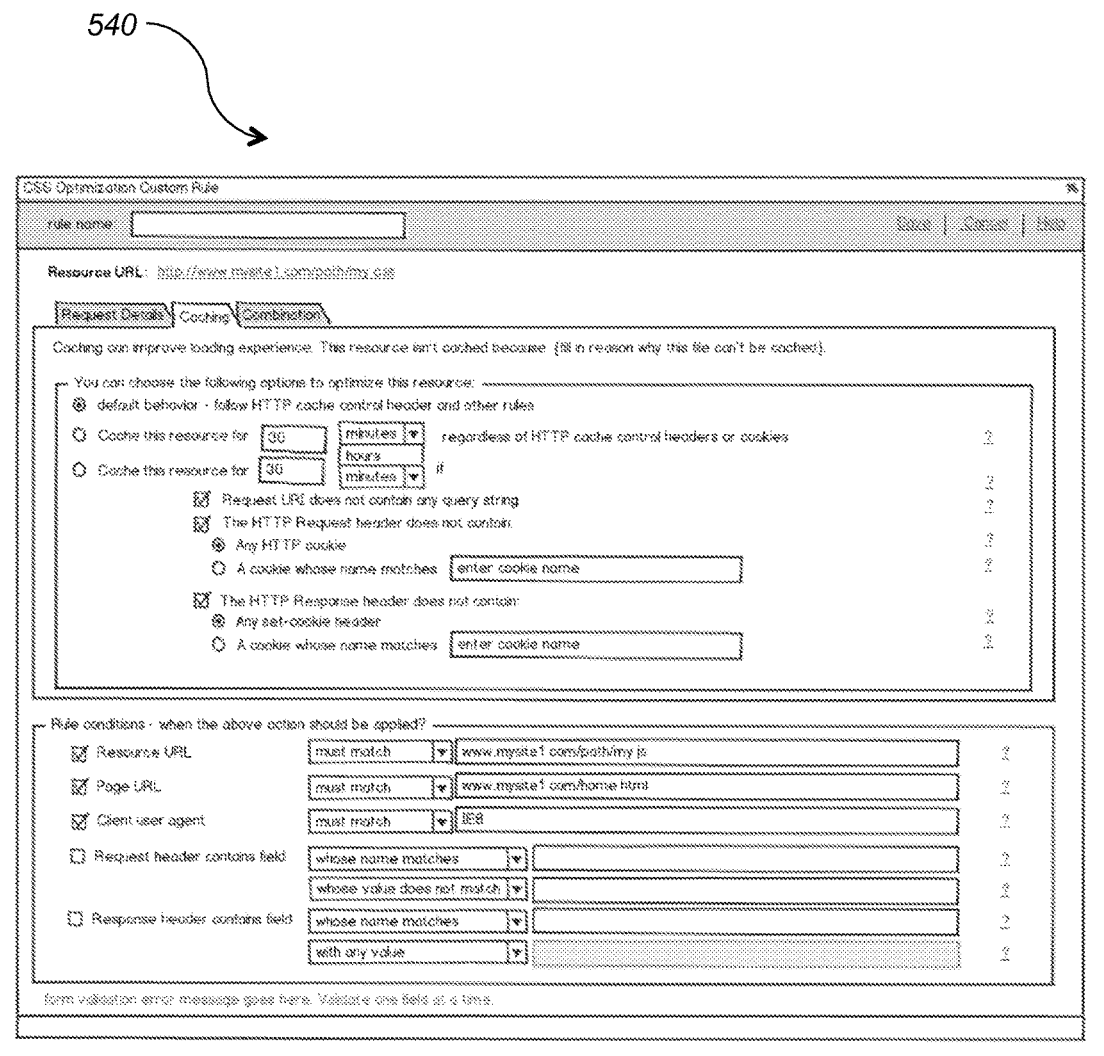

FIG. 25 depicts a UI for selecting parameters for CSS optimization via caching;

FIG. 26 depicts a UI for selecting parameters for HTML optimization via caching.

DETAILED DESCRIPTION OF THE INVENTION

Figure 1:
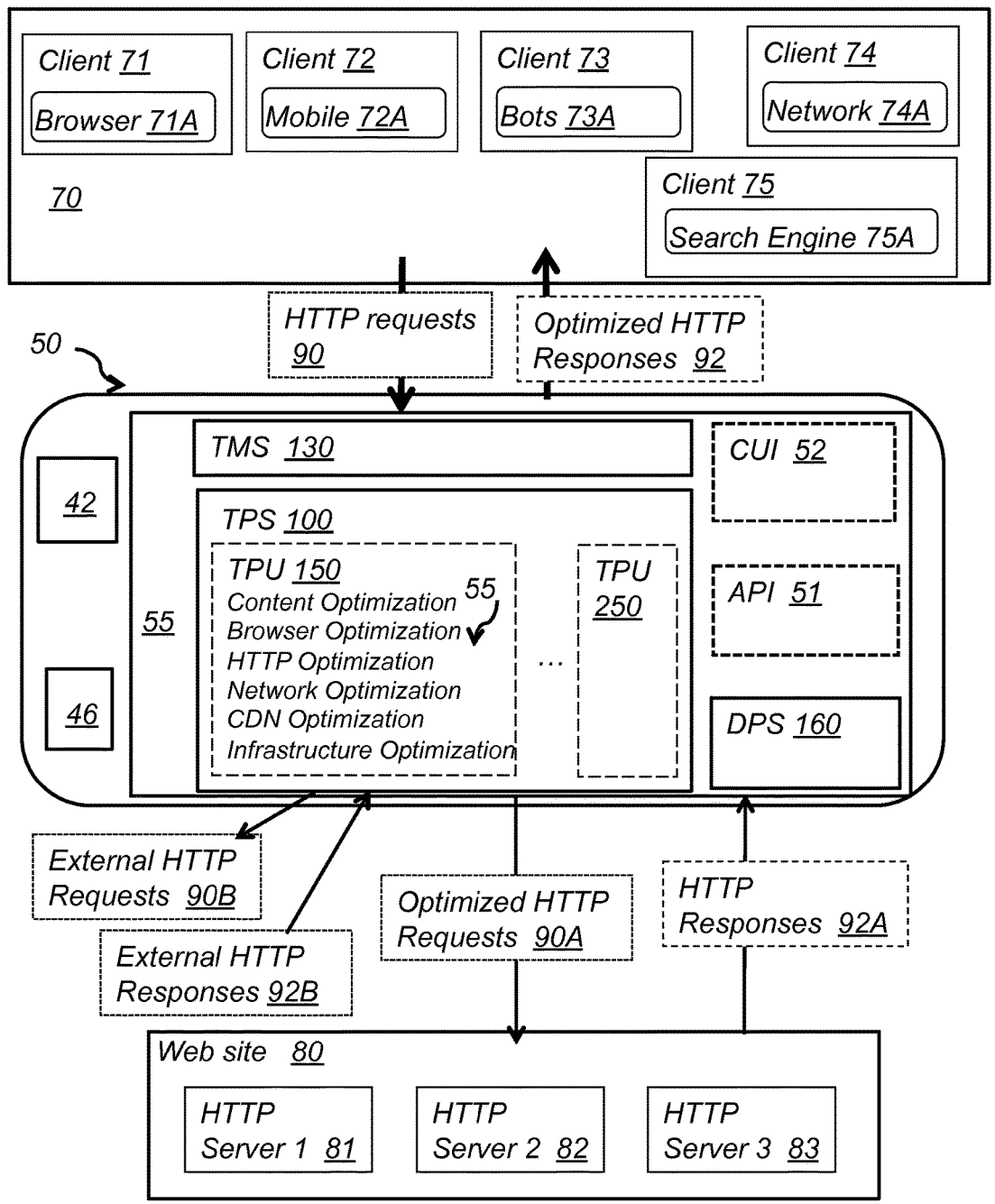
FIG. 1 is an overview diagram of a context-specific web optimization (CWO) system according to this invention.

The present invention relates to a system and a method for context specific website optimization, and in particular, to a system and a method that optimizes a website to produce optimal results for different contexts. These contexts specific optimizations include website performance optimization, website optimization for different browsers, website optimization for different network connectivity, website optimization for different search engines, website optimization for better user experience on mobile devices as well as website optimization for better security.

The present invention relates to a system and a method for iterative customized website optimization, and in particular, to an iterative process and the corresponding customized user interface to support this iterative process. The present invention is particularly relevant to achieving certain website optimization objectives. These website optimization objectives include website acceleration, website security, website search engine optimization (SEO) for achieving better search engine visibility, and mobile website development.

The present invention also relates to a customizing user interface (CUI) for providing context specific web optimizations.

The system includes a tester that performs measurement of the website against a selected optimization objective, an optimizer that optimizes the website in order to achieve the selected optimization objective and a visualizer for presenting the test results for analysis. The system also includes a customized user interface for selecting custom optimization parameters.

The system performs the following steps:
1. Run a test for the website ("Test") to measure the website against the selected optimization objective.
2. Present the test result ("Visualize") to analyze the website against the selected optimization objective.
3. Add/Edit/Remove settings for optimizations and apply the selected optimizations to website ("Optimize").
4. Repeat the above process until the desired result is achieved.

As was mentioned above, the various website optimization objectives include acceleration, improvement of website search engine results, improvement of website security, and transformation of the website to deliver a better user experience on various mobile devices. The testing system (Tester) measures the user experience of the website on various mobile devices for the selected optimization objective or the website performance on various browsers. The system includes a visual presentation UI (Visualizer) that presents the test results for analysis. The system also includes an optimization system (Optimizer) that transforms the website and optimizes the website. The optimization system provides the initial transformation for the website. The testing system tests the result from the initial transformation. The visual UI presents the test results. The user tunes the optimization system to improve the transformation for improved layout, improved screen presentation and improved performance, among others. The test system tests the result again and the process repeats itself until a desired result is achieved. The CUI fully integrates Tester, Visualizer and Optimizer to provide deep insights into optimization bottlenecks as well as one-click access to actions for solving these bottlenecks, thereby enabling fast and intuitive iterative tuning.

Figure 2:
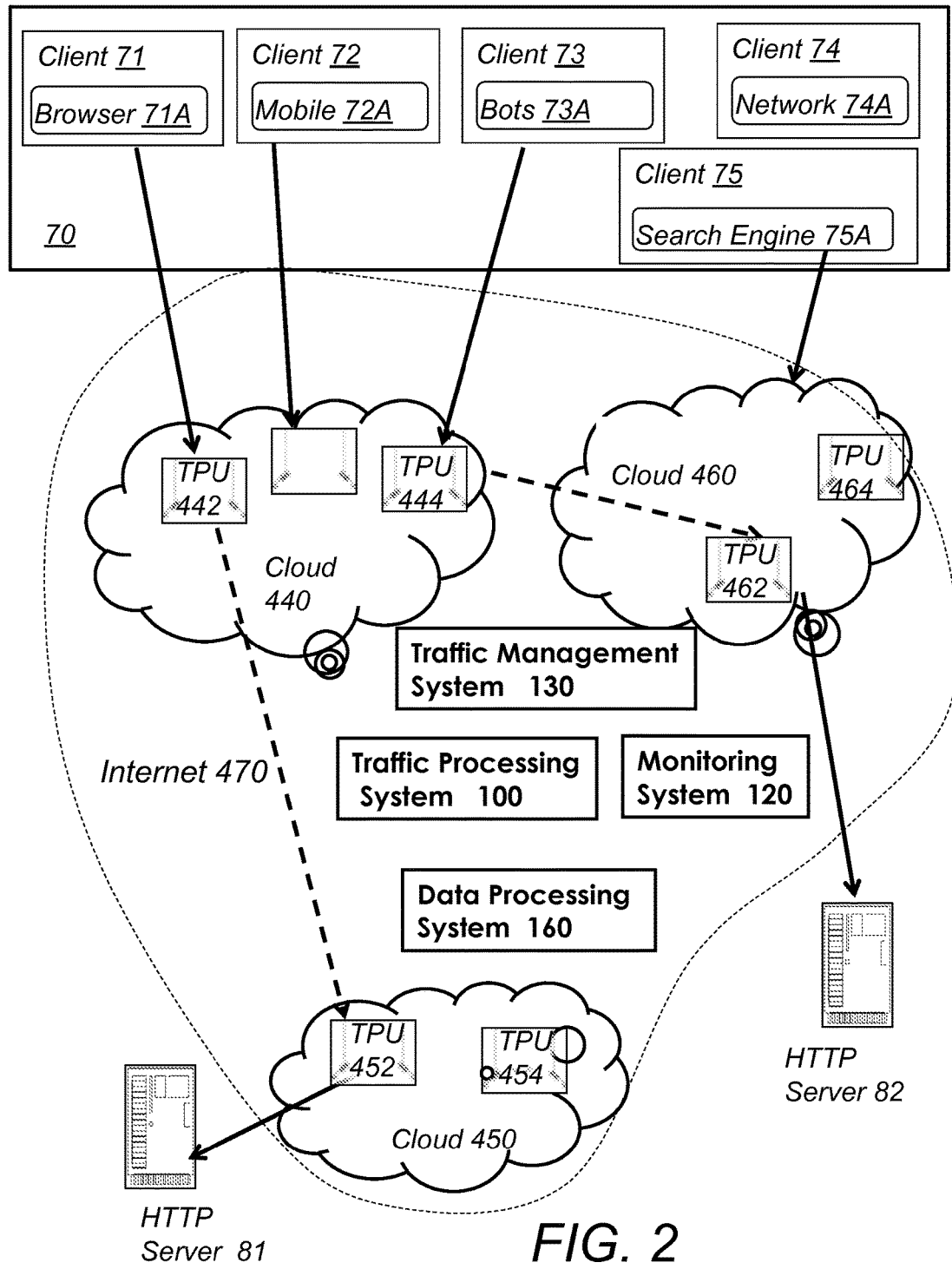
FIG. 2 depicts a schematic diagram of a cloud-based CWO according to this invention.

Referring to FIG. 1 and FIG. 2, a networked context-specific web optimization system (CWO) 50 includes a traffic processing system 100 (TPS), a traffic management system 130 (TMS) and a data processing system 160 (DPS). The customized web optimization system 50 further includes an application programming interface (API) 51, a customizing user interface (CUI) 52, a tester 42, an optimizer 55 and a visualizer 46. The TPS 100 includes geographically dispersed traffic processing units (TPU), such as TPU 150, TPU 250, shown in FIG. 1 or TPU 444, TPU 442 in cloud 440, TPU 464, TPU 462 in cloud 460, TPU 454, TPU 452 in cloud 450, shown in FIG. 2. TPS 100 receives and processes HTTP requests and responses between clients 70 and website 80 and TMS 130 manages the routing of client requests through TPS 100. DPS 160 contains the various data gathered for optimal traffic processing, such as status of the network, status of various HTTP servers, settings, configuration, optimization status, customer information, pricing information, website performance, optimization technique configurations, load balancing preferences, security threats, transformation rules, transformation templates, among others. Third parties may use the customizing user interface 52 or API 51 to query, add, remove and adjust the settings, status, configuration of the entire system to achieve desired results. Furthermore, CUI 52 allows third parties and users to specify optimization parameters, test the website and based on the test results tune the optimization parameters to further optimize the website, as shown in FIG. 3B.

Clients (web users) 71, 72, 73, 74 and 75 use web browsers 71A, mobile devices 72A, bots 73A, networks and search engines to connect to hypertext transfer protocol (HTTP) servers 81, 82, 83 where website 80 is running. When the clients issue HTTP requests 90 to website 80, these HTTP requests are directed to pass through the intermediary component 50. This HTTP request re-direction is managed via the TMS 130. Upon receiving HTTP requests 90 from clients 71, 72, 73, 74, 75, TPS 100 analyzes the HTTP request, determines the client type and selects and applies context specific optimization techniques 55 to process these requests. As a result of optimization, some of the requests are fulfilled locally within TPS 100, some of the requests are forwarded to external hosts for fulfillment, such as external HTTP requests 90B, and some of the requests are forwarded to website 80 for processing, such as optimized HTTP requests 90A, As responses to optimized HTTP requests 90A, TPS 100 receives HTTP responses 92A from website 80. Further, as responses to external HTTP requests 90B, intermediary component 50 also receives external HTTP responses 92B. Upon receiving any of these HTTP responses, TPS 100 immediately applies optimization techniques 55 to optimize the received HTTP response. After optimization processing, TPS 100 eventually forwards the processed HTTP responses 92 to clients 70. Clients 70 may be different type of devices, including desktop and mobile devices 72A. The mobile devices may be an Apple iPhone, an Apple iPad, an Android tablet, or any other android type mobile device, among others. The web browsers that the clients use to access the website 80 may be Safari, Internet Explorer, Mozilla, Firefox, or Google Chrome, among others. Clients 70 may be search engine bots 73A such as Google bots, Microsoft Bing bots, Baidu bots, Ask.com bots, among others. Search engine bots are used for crawling pages on the website. The more pages these bots crawl, the more keywords these bots can index, and the better the search visibility of the website will be. Therefore, the better a website can interact with these bots, the more search visibility the website will have and thus the website will be more successful. Clients 70 may connect to the website 80 via different type of networks 73A. Examples of such networks include cable modem, DSL, wireless, T1, among others. Different network connectivity has different characteristics. Some are slow and have low bandwidth. Web pages with low graphics and simpler designs can deliver the best experience in this case. Some have high bandwidth and fast speed, through which a highly visual rich interactive experience including video, audio and images can be delivered to achieve an engaging experience. In either case, if the website isn't smart about making proper tradeoffs, it may deliver a bad experience and fail.

Figure 3A:
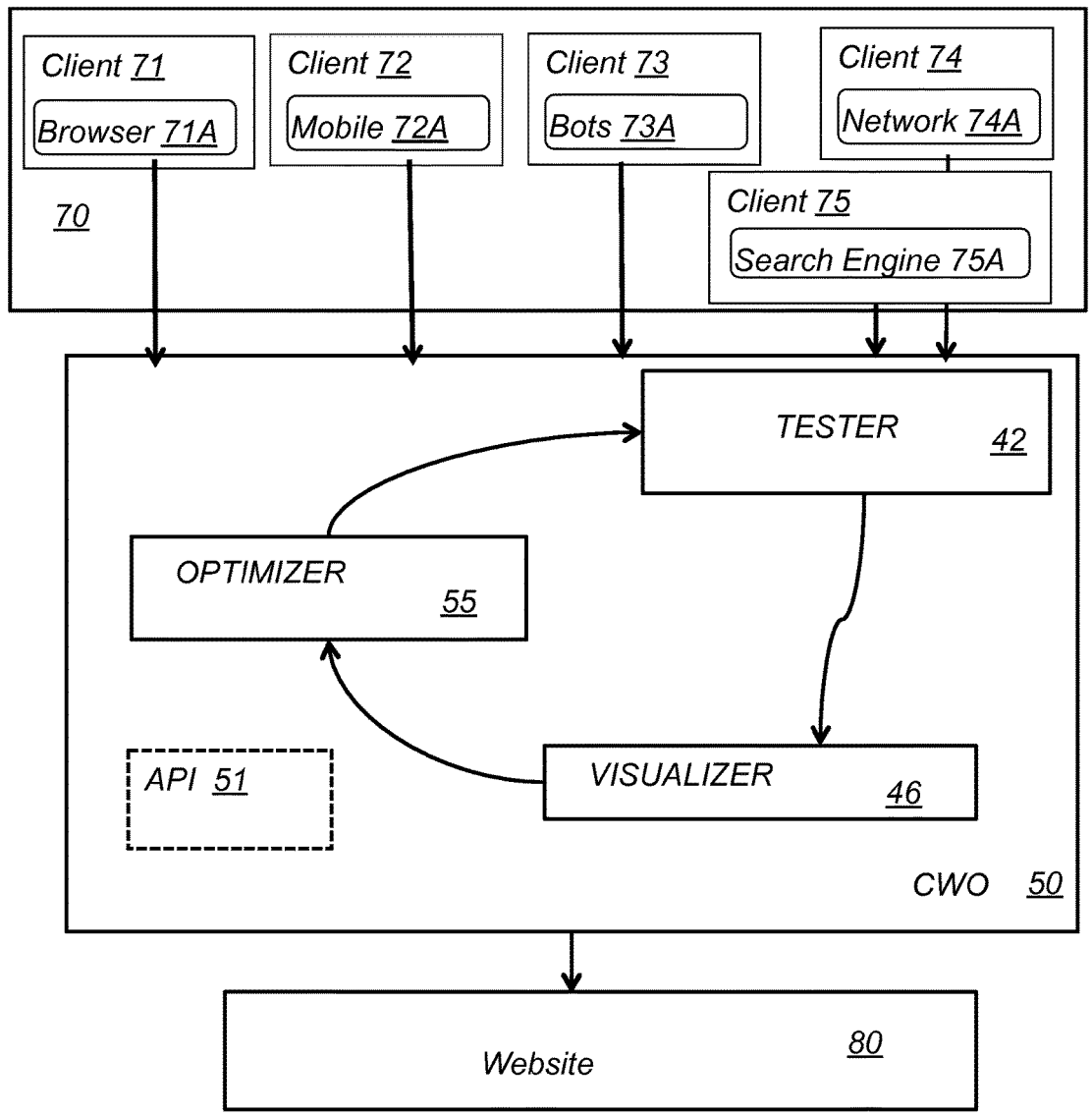
FIG. 3A is an overview block diagram of a CWO system according to this invention.

Referring to FIG. 3A, and FIG. 1, the context-specific web optimization system (CWO) 50 includes a tester 42, an optimizer 55, a visualizer 46, an application programming interface (API) 51 and a customizing user interface (CUI) 52. The tester 42 measures the website performance against a selected optimization objective. The optimizer 55 optimizes the website in order to achieve the selected optimization objective and the visualizer 46 presents the test results for analysis. Optimizer 55 performs website optimization techniques 55 including content optimization, browser/device optimization, HTTP optimization, network optimization, request optimization, Content Delivery Network (CDN) optimization and infrastructure optimization. The customized user interface 52 is used for selecting custom optimization parameters.

Figure 3B:
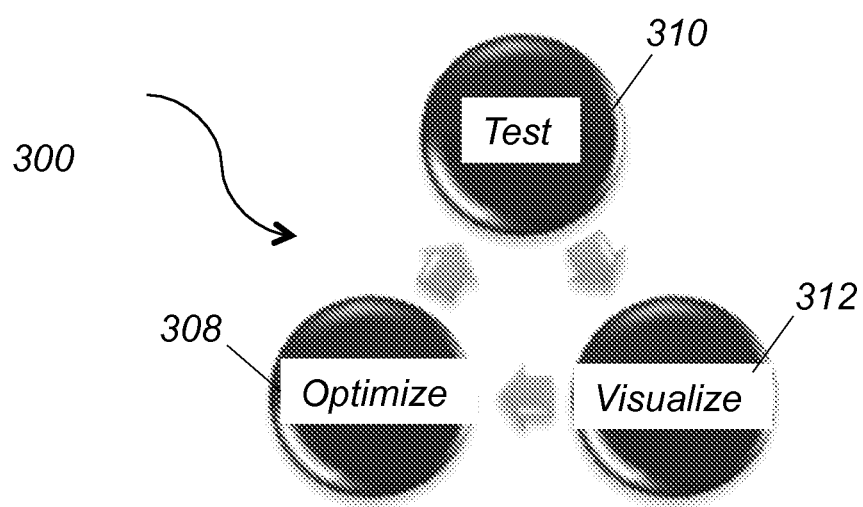
FIG. 3B depicts the steps of the iterative optimization process of this invention.

Referring to FIG. 3B, an iterative closed loop web optimization process 300 of this invention includes the following steps. First, a user sign-ups with the CWO, activates his account and then optimizes a selected website objective/function with the CWO (308). Initially the optimization parameters for the website objectives/functions are the system selected default parameters. Next, the user selects a specific website objective/function he would like to optimize and specifies the optimization parameters and values for the chosen objective/function and then optimizes the website with the CWO (308). Next, the user tests the selected website objective/function (310) and then visualizes the optimization results (312). The user repeats this process until a desired optimized website objective/function is achieved. The CWO system 50 groups default optimization rules into different categories and allows the user to selects specific categories and optimization parameters via the customizing user interface (CUI) 52.

Figure 14A:
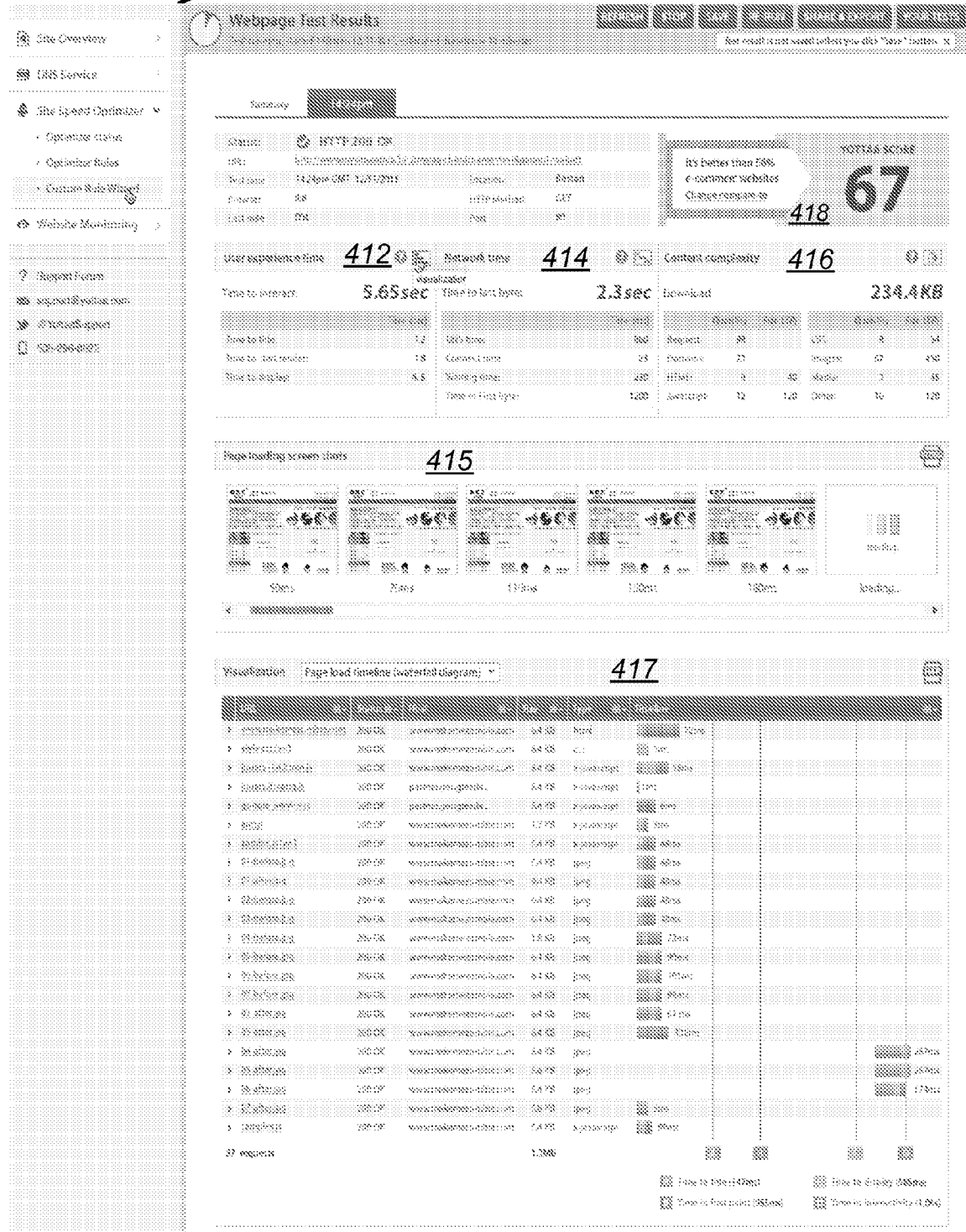
FIG. 14A is a waterfall diagram for visualizing page load timing within a browser.
Figure 14B:
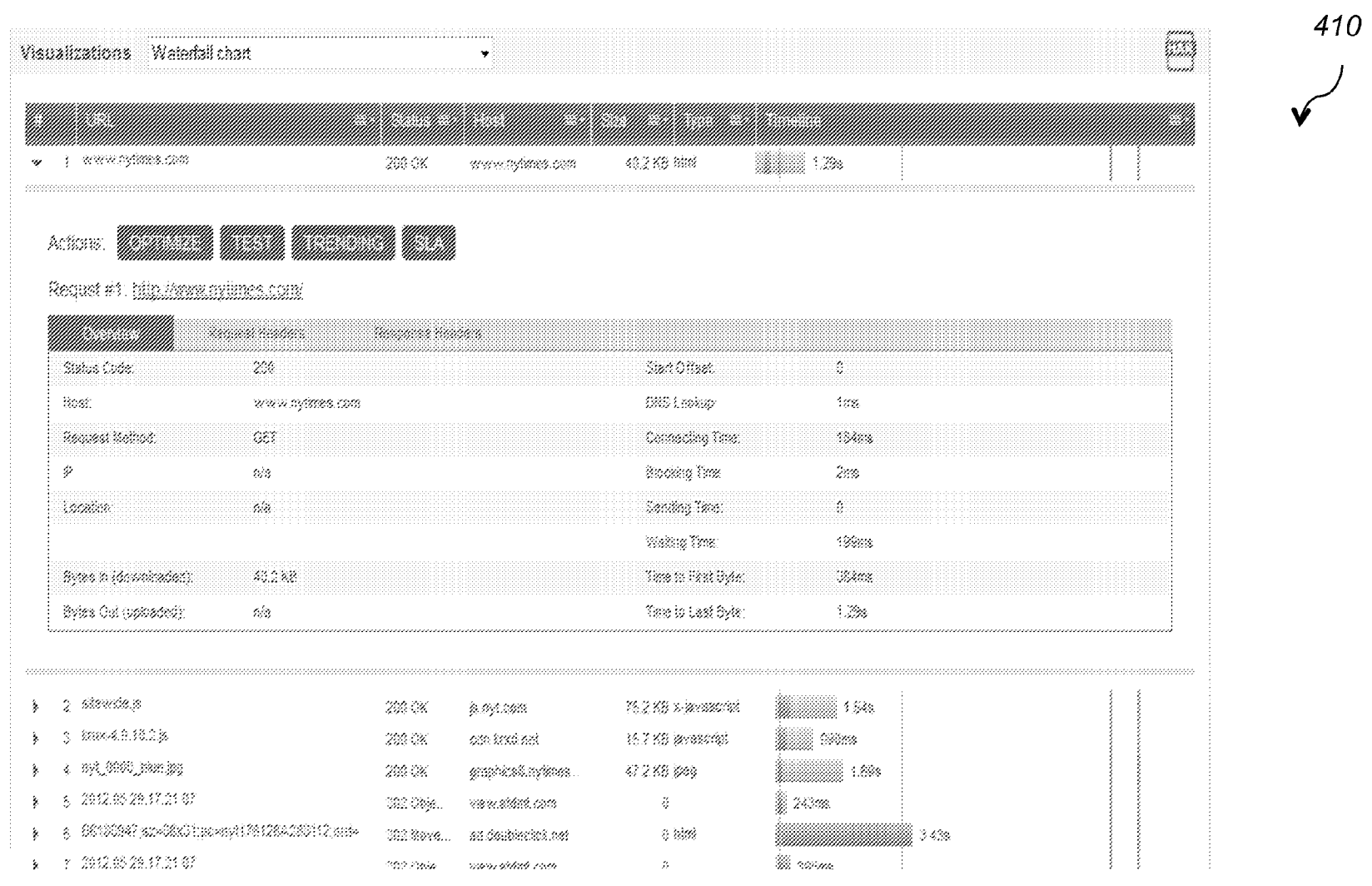

Different from prior art techniques where optimization is manual and time consuming, the CUI fully integrates Tester, Visualizer and Optimizer to provide deep insight into optimization bottlenecks as well as one-click access to actions for solving these bottlenecks, enabling fast and intuitive iterative tuning Referring to FIG. 14B, a user can identify which asset is the slowest from the page load waterfall diagram. Once the slowest asset is identified, the user can click any integration action buttons, including "OPTIMIZE" button, "TEST" button, "TRENDING" button and "SLA" button. Upon an action button click event, the CWO system 50 shows the relevant optimization techniques and settings to allow the user to configure for further optimizing the specific asset. Some examples include the following:

If the asset is a Javascript file, a list of optimizations available for Javascript is presented, as shown in FIG. 17. These techniques include asynchronous loading, JS combination and caching for example.

Figure 22:
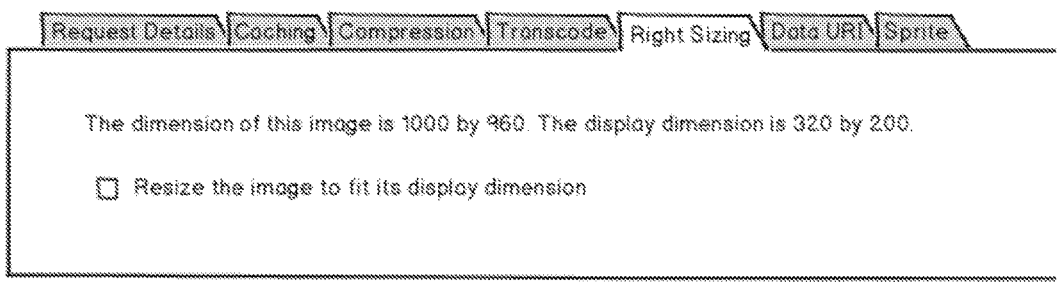
FIG. 22 depicts a UI for selecting parameters for image optimization via right sizing.
Figure 23:
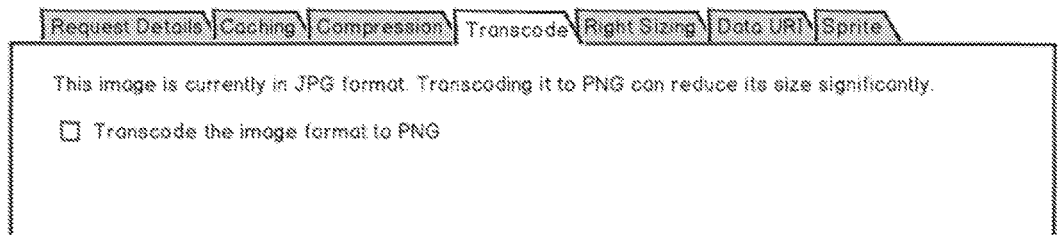
FIG. 23 depicts a UI for selecting parameters for image optimization via transcoding.
Figure 26:
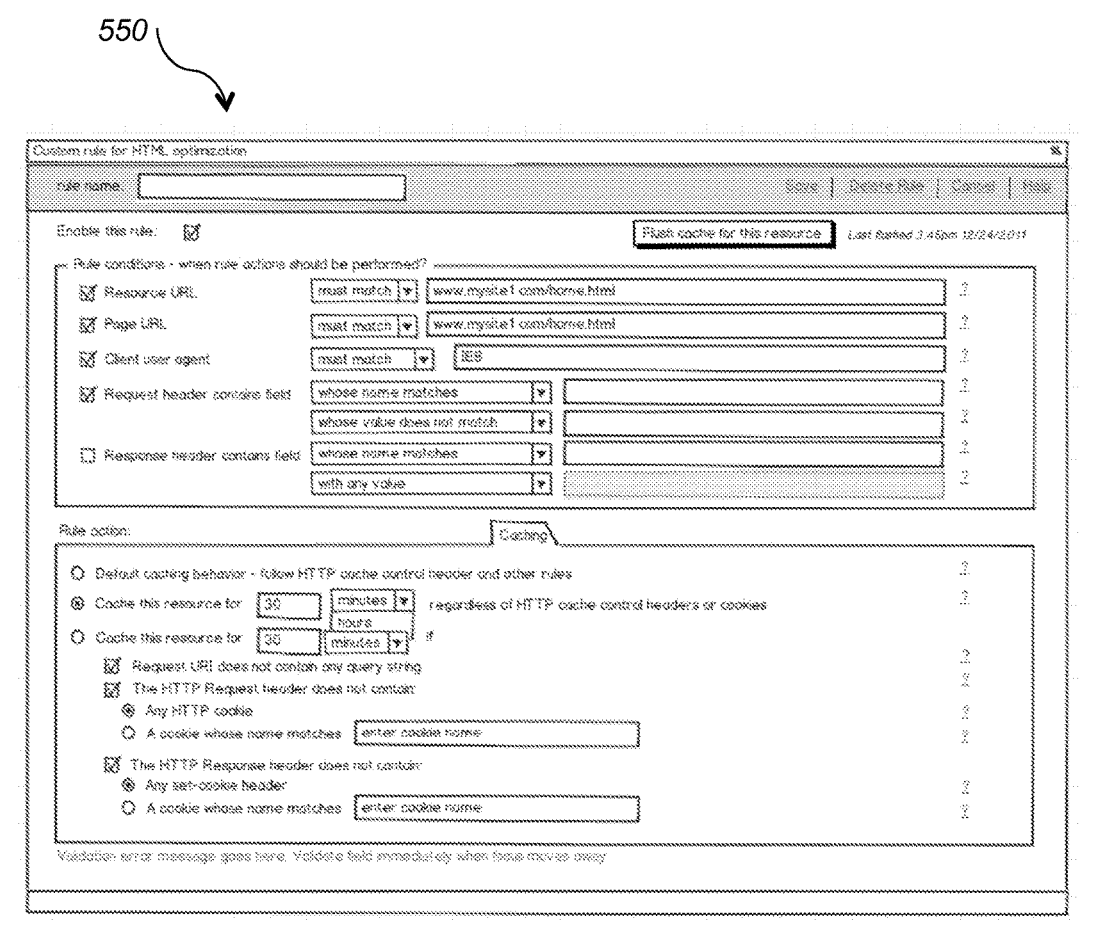

If the asset is an HTML file, a dialog as shown in FIG. 26 is presented to provide HTML specific optimizations;

If the asset is a CSS file, a dialog as shown in FIG. 25 is presented to provide CSS specific optimizations;

If the asset is an image file, a dialog as shown in FIG. 21, FIG. 22 and FIG. 23 are presented to provide further image optimizations. The provided techniques include image compression, image right sizing, image transcoding, and image caching for example.

Likewise, if the user clicks "TRENDING", the user can drill into trending data for the specific resource to identify the performance pattern of the resource. If the user clicks "TEST" button, the user can run a more extensive test of the resource for deeper insights. If the user clicks "SLA" button, the user can specify optimization actions based on Service Level Agreement (SLA) conditions, for example, excluding the resource from the web page if the resource exceeds its SLA threshold.

Context-Sensitive Website Optimizations

As was mentioned above, the system 50 provides website optimization objectives that include website performance optimization, website security optimization, website search engine optimization (SEO), and mobile website deployment.

Website Performance Optimization

The website performance optimization techniques 55 include the following categories: content optimization, browser optimization, HTTP optimization, network optimization, Content Delivery Network (CDN) optimization and infrastructure optimization.

Content optimization reduces the number of HTTP requests required to load a webpage and includes optimization of the following items: Hypertext Mark-up Language (HTML) pages, JavaScript files, Cascading Style Sheets (CSS) files, image files and media files. Content optimization of HTML pages includes minification, Gzip, resource bundling, de-duplication, request order shifting, resource inlining and Data Uniform Resource Interface (DataURI) technique. Content optimization of JavaScript files includes minification, Gzip, JavaScript file bundling, obfuscation, de-duplication, JavaScript inlining, JavaScript concatenation and compression, deferred execution and DataURI technique. Content optimization of CSS files includes minification, Gzip, CSS bundling, obfuscation, de-duplication, CSS inlining, sprite, concatenation and compression and DataURI technique. Content optimization of image files includes metadata removal, color table adjustment, right sizing, sprite, DataURI technique and compression. Content optimization of media files includes metadata removal, viewport right sizing, transcoding and compression. Furthermore, HTTP web content optimization includes domain sharding.

Browser optimization refers to detecting the unique capabilities of the specific browser of each web user (client) and rewriting content to utilize the specific browser's unique capabilities in order to improve the browsing experience. Browser optimization techniques include domain sharding, SPDY (Speedy), client-side caching, viewport detection and prioritization and mobile transformation. Domain sharding (or splitting) refers to taking a bunch of resources that are being downloaded on a single domain and splitting them across multiple domains to enable multiple simultaneous connections. SPDY refers to an experimental application-layer protocol for transporting content over the web, designed specifically for minimal latency. Client-side caching refers to detecting the caching capability of the client browser and maximizing client-side caching. Viewport detection and prioritization refers to optimizing HTTP content that is visible in the detected viewpoint and optimizing HTML page layout for the specific client browser to improve rendering time. Mobile transformation refers to detecting the client browser as a mobile browser (i.e., browser for mobile communication devices) and transforming the web content to fit the mobile browser screen display and rendering.

HTTP optimization refers to techniques used to improve webpage loading speed. HTTP optimization includes applying "Gzip" to HTTP content and setting "Gzip" header, using HTTP 1.1 when possible to reuse HTTP connections, using SPDY protocol when client side user agent supports it, setting proper HTTP caching headers, offloading HTTPS/SSL processing from HTTP server and prefetching. Prefetching refers to optimizing website performance by analyzing an HTTP response for additional web resources that are required, requesting such web resources from the target server before requests for such resources have been received, and serving such resources upon receiving such requests.

Network optimization refers to techniques used to improve webpage loading speed. Network optimization includes using optimized transport protocols rather than TCP protocol, detecting connection congestion status and selecting uncongested connections, optimizing TCP parameters to improving connection handling with the client side browser as well as the target HTTP server, connection reuse, use of SPDY and use of parallel networking techniques. The intermediary component uses multiple intermediary nodes to relay connections between the browser and the target HTTP server. The intermediary nodes communicate with each other using an optimized network protocol. In some embodiments, the intermediary nodes communicate with each other using multiple parallel connections, and split traffic payload among these parallel connections for network transmission.

CDN optimization includes CDN provisioning and CDN balancing. The intermediary component uses CDN provisioning to optimize web performance, by detecting cacheable assets, automatically storing the cacheable assets in selected CDNs, managing these assets and serving them from these CDNs. The intermediary components uses CDN balancing to optimize website performance, by monitoring the performance and cost of various CDNs and serving assets from the best CDN according to a certain measure.

Infrastructure optimization includes Domain Name Service (DNS) optimization, increased number of servers, server load balancing, global load balancing automatic failover, and improved reachability by adding more data centers and/or by adding more edge presence for assets.

In one example, TPS 100 is a proxy server. In other examples TPS 100 is a library module that runs as part of the HTTP servers or a hardware device that connects web visitors 73, 72, 71 to the HTTP servers 81, 82, 83. The TMS 130 redirects the HTTP requests 90 from the web users to the TPS 100. The TPS 100 applies the above mentioned optimization techniques to the HTTP request and forwards the optimized request 90A to the target server 81 of website 80. The target server 81 processes the optimized HTTP request 90A and sends back an HTTP response 92A to the TPS 100.

The TPS 100 applies the above mentioned optimization techniques to the received HTTP response 92A and sends an optimized HTTP response 92 to the user's browser 73A.

In another example, the intermediary component 50 is cloud based and is designed to run on a private cloud, public cloud or a hybrid cloud computing infrastructure, as shown in FIG. 2. This cloud based system is designed to run in many different geographic locations around the world. The cloud based intermediary component system adjusts its processing capacity by scaling up and down its computing infrastructure capacity in response to the traffic processing demand, as described in U.S. Pat. No. 8,112,471, the contents of which are incorporated herein by reference. This cloud routing network is also called an "Application Delivery Network (ADN)" sometimes in the rest of this document.

In another example, the traffic management mechanism 130 that redirects traffic to the intermediary component 50 is a domain name service (DNS) based mechanism. A canonical name (CNAME) is added to the DNS record of the website 80 domain name (www.mysite.com) and the CNAME is resolved to the traffic processing system 100. In other embodiments, the DNS record of the website is hosted in the TMS 130 as a DNS hosting service and the TMS resolves the DNS requests to the TPS 100. In other embodiments, the traffic management mechanism is a network gateway based mechanism and webpage requests are configured to go through this network gateway.

Content Optimization

Web pages are made up of many different web resources that vary in their content-type and purpose. Each web resource is stored and requested individually on a web server. This web page structure makes deployment of web pages and websites easy as there is no building process needed for web resources. However, the issue with this deployment model is that the web browser needs to request each of the web resources individually. The web browser requests one web resource and then processes it to see if other web resources are needed. If more resources are required, it will request them one at a time and then it will repeat the process.

Today's websites require many web resources to create the interactivity and presentation envisioned by their designers. Ajax, Web 2.0, and Collaboration Websites all lead to an increase in the interactivity and design required to acquire and keep customers. Developers take the ideas and design and implement web pages by breaking up the page into images, JavaScript, CSS, HTML, and media (Flash, Sound, Video). Developers do this in a way that makes it quick to build, debug, deploy, test, and maintain. This web page development process usually results in resources being broken down into specific tasks including, JavaScript files that implements a specific set of tasks, CSS files that manage the presentation of a certain section, component or element of a page, and images that display one graphical element of a page. The above mentioned method of processing these multi-resource containing web pages by a web browser causes the following issues.

Browsers can only open a limited number of connections to the web server. For instance, if the browser can only create two connections with a web server, resource requests will be queue up until the previous resource is completely downloaded.

Large amount latency between the web browser and visitor, creates an even greater amount of page load time because of the request queue.

Content may be larger than required by the web browser for rendering purposes. Developers typically include whitespace and comments in the resources to make development easier. Developers also structure the resource in a non-optimal way for downloading and rendering.

Duplicate content wastes bandwidth. Duplication can either be multiple links to the same resource or multiple pieces of content within resources that are the same.

The content optimization service of the TPS system resolves these issues by default and without developers having to change the way they build their websites or create their resources. The method for providing content optimization includes the following steps. First, a client wanting to use the TPS content optimization service creates an Application Delivery Network (AND). Next, the client changes their DNS setting for their website to point to the TPS's traffic management system. When a visitor requests a resource from the client's website, the request is routed to one of the TPS routers. Next, the router requests the resource from the client's origin server. When the origin server responds with the content, the client's optimization scenario configures the routers content optimization service to apply the desired optimization techniques.

By applying the content optimization as it is streamed through the routers, the TPS achieves a significant reduction in the number of resources requested and the amount of the bytes needed for each resource. This results in a significant savings in web page loading time and user experience.

Optimization Techniques

A set of content specific processing units that are applied to content. Each processing unit is designed to optimize the content in a specific way. Below is a list of optimization techniques that are applied to content:

HTML
  Resource Bundling—takes multiple resources of the same type and combines them into single resources. This technique can be applied to CSS files, JavaScript files and Images
  Duplicate Resource Removal—removes resource requests that are the same as a previous resource.
  Resource Request Shifting—changes the order in which resources are requested by the browser. This is done by moving their location into a more preferred location in the HTML file. An example of this is moving JavaScript resource requests to the end of the HTML page CSS
  Resource Bundling—resolves embedded CSS import statements
  GZipping—applies a GZip encoder to a CSS files to decrease its size. This technique also changes the content-type and content-encoding headers so that the web browser renders it correctly.
  Minification—removes comments and whitespace from CSS files.
  Duplicate Content Removal—removes content within a CSS file that is a duplicate of another section.
  Property Optimization—changed properties are specified individually to be specified inline if they can be. An example of this is changing css element .myClass {background-color:#aaa; background-image:URL('test.jpg')} to .myClass {background: #aaa URL('test.jpg')}
  Element Optimization—removal of any unneeded characters within a CSS element declaration. An example of this is removing the trailing ";" in the last property. In .myClass {color:#aaa;} the ";" after #aaa is removed.
  CSS Spriting—turns multiple background images into a single image and changes their associated CSS element properties.

JavaScript
  Minification—removes comments and whitespace from JavaScript files.
  Obfuscation—shrinks the variable names and parameters of JavaScript code.
  GZipping—applies a GZip encoder to a JavaScript files to decrease its size. This technique also changes the content-type and content-encoding headers so that the web browser renders it correctly.
  Duplicate Content Removal—removes content within a JavaScript file that is a duplicate of another section.

Images
  Meta-data Removal—removes unneeded meta-data from images
  Color Table Adjustment—changes the color table in images to create a smaller image
  Right-sizing—changes the size of the image to match the display size when rendered
  Compression—changes the image's compression variable to become smaller Media
  Compression—changes the media's compression variable to make the media smaller
  Transcoding—changes the format of the media to match the visitor's device properties. An example of this is changing a Flash page element into an image for displaying it on an iPhone.

In most of the prior art web optimization systems, the user is presented with an optimization package solution. These prior art optimization packages are applied in their entirety to a website and they do not allow for any intuitive customization. In particular, the user does not have the option to select and apply specific optimization functions either alone or in various combinations directly from the testing result visualization. The present invention provides an iterative closed loop web optimization solution that visualizes the website testing results to help the user identify bottlenecks, provides integrated action buttons directly from the visualizations to allow the user to select specific optimization techniques and parameters, applies the selected specific optimization techniques and parameters to the website, and then tests the website again. Based on the website test results, new optimization techniques or parameters are chosen and applied until a desired website optimization result is achieved.

Figure 4:
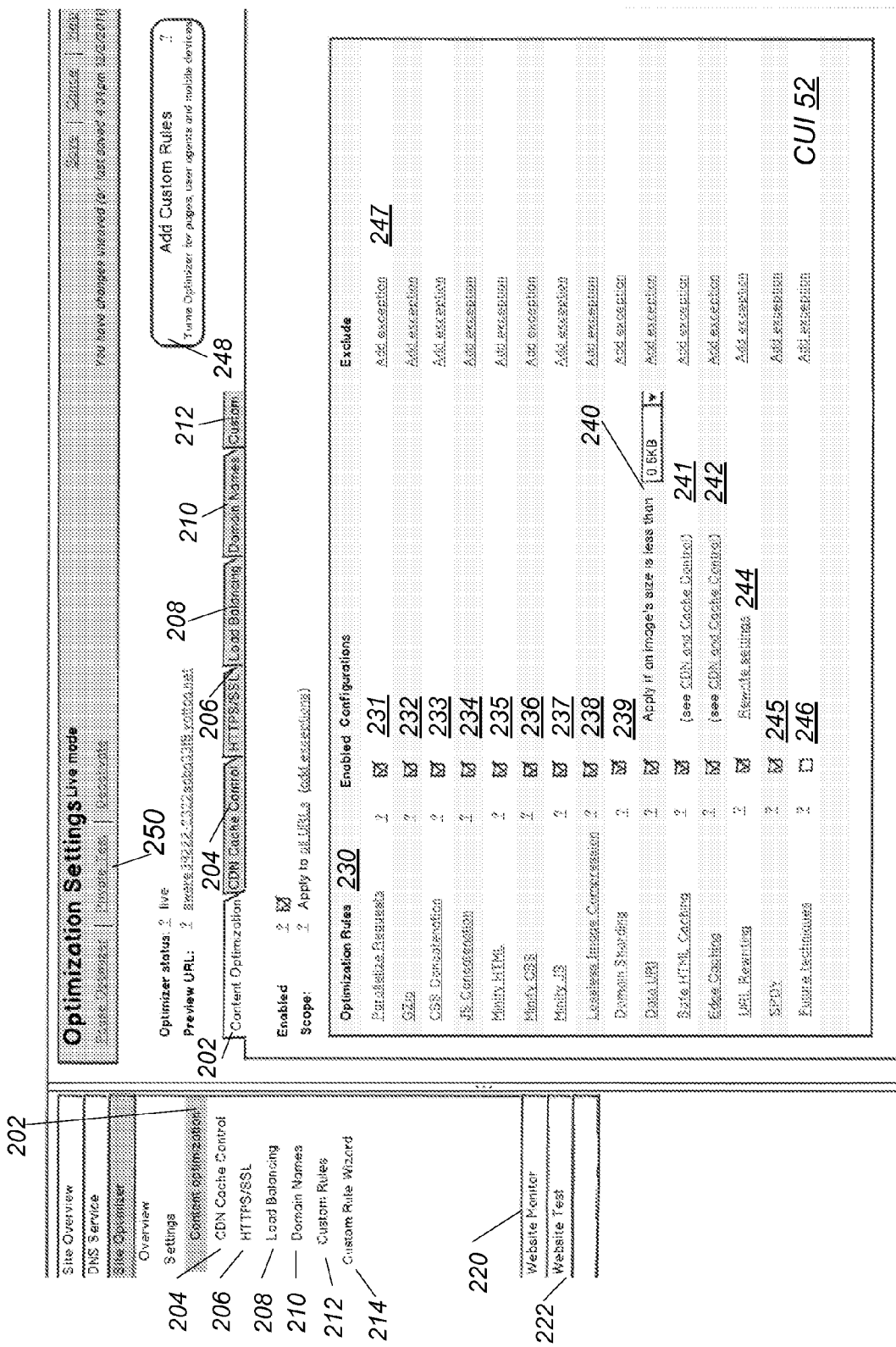
FIG. 4 depicts a customizing user interface (CUI) for providing context specific web optimization according to this invention.

Referring to FIG. 4, optimizer 55 presents optimization settings for various categories via the CUI 52. The various optimization categories include content optimization 202, CDN cache control 204, HTTP/SSL 206, load balancing 208, domain names 210, custom rules 212, among others. The CUI 52 also presents a custom rule wizard 214, a website monitor 220 and a website test 222. The user is allowed to turn on or off an entire category and to add specific exceptions to each category via the custom rules function 212. Furthermore, the user is allowed to define custom rules for each category via the custom rule wizard 214, to test the website privately via the website test 222, and to monitor the website via the website monitor 220. As was mentioned above, the initial settings for each optimization category are the system selected default parameters. The system configures the default parameters so that they can be applied to almost any website and can work for any HTTP resource. Fine-grained optimization tuning is provided via the "custom rule" 212 function. A custom rule contains two components: rule condition and rule action. The rule action is typically one specific CWO technique and the rule condition may be as granular as individual HTTP requests and responses. A custom rule tells the system to apply a specific rule action for any HTTP request and response that satisfies the rule's conditions. The typical rule actions are CWO techniques that are suitable for a particular HTTP resource. Examples of rule actions and conditions are shown in the table below:

TABLE 1

Examples of rule actions and conditions applied for specific HTTP resources

| HTTP RESOURCE TYPE | TYPICAL RULE CONDITIONS Matching one of: | CWO TECNIQUES USED FOR RULE ACTIONS |
|---|---|---|
| HTML | Resource URL Page URL | Edge caching, minification |
| IMAGE | Client user agent Client screen size Request IP address | Edge caching, client side caching, data URI, CSS sprite, trans-coding, lossless compression, lossy compression, right sizing, down sampling |
| JAVASCRIPT | Request HTTP or TCP connection parameters | Edge caching, client side caching, data URI, combination, Async, minification |
| CSS | Request network connection pattern | Edge caching, client side caching, combination, minification |
| OTHERS | HTTP request header HTTP response header | Edge caching, client side caching, data URI, combination, Async, minification |

Additional examples for rule conditions and rule actions include the following:
  Service level agreement (SLA) event triggered rules:
    Exclude/include HTTP/HTML resources. For example, if the performance (SLA) of an external HTTP/HTML resource is slower than a certain pre-defined threshold, exclude that HTTP/HTML resource from the page;
    Replace HTTP/HTML resources: for example, if the performance (SLA) of an HTTP/HTML resource exceeds a certain threshold, replace it with some other resource;
  Geography-based rules:
    Exclude/include HTTP/HTML resource:
      Geography-based resource exclusion: if the visitor comes from a certain geography, exclude a certain HTTP/HTML resources from being delivered to that visitor. This is very useful. for example, some countries such as China block access to Facebook and Twitter. So if a webpage has a Facebook widget or Twitter widget, that page will be blocked from loading inside China because of the Facebook or Twitter widget. Excluding the facebook or Twitter widget will solve this problem.
    Replace HTTP/HTML resources:
      Resource replacement: if the visitor comes from a certain geography, replace the specific HTTP/HTML resource with some other resource;
  Business priority based rules
    Visitor traffic prioritization: serve a certain kind of visitors with higher priority, such as visitors on certain pages (shopping pages for e-commerce websites for example) or are within a certain process (such as e-commerce checkout process) with higher priority;
    For higher paying customers, serve their traffic using a higher class network infrastructure and/or better CDN;
  Security related rules
    Client filtering based on client network access pattern:
      Rate throttling: limit the rate of requests from each client to a pre-defined maximum rate to prevent security attacks
      IP blocking: block out a certain client IP addresses to prevent spam or attacks. These IP addresses can be pre-defined, automatically learned (and improved) by the system or fed from some external sources;
      Bot blocking: block out a certain bots
    Client filtering based on HTTP request data
      Web crawler blocking: prevents a certain web crawlers from crawling the web site
      Malware detection: using malware signature to detect if the webpage has been infected by malware, and automatically take actions if the malware is detected
      HTTP attack prevention
      HTML attack prevent such as cross site scripting attack, SQL injection detection and prevention, request forgery attacks, among others.

The above mentioned HTTP/HTML resources may be some HTML code snippet, Javascript code snippet, an Adobe Flash widget, or a third party web widget, among others. The resource may be hosted either on the same website or on a third party website, or even contain child resources that are loaded from multiple websites. Examples of such resources include Google Analytics widget, visitor tracker tags, Facebook widget, Twitter widget, Google PlusOne widget, Youtube video player, among others. The list of HTTP/HTML resources can be continuously growing and added to the CWO. Further, the CWO may provide additional customizing user interface to help users manage and configure these resources.

Figure 5:
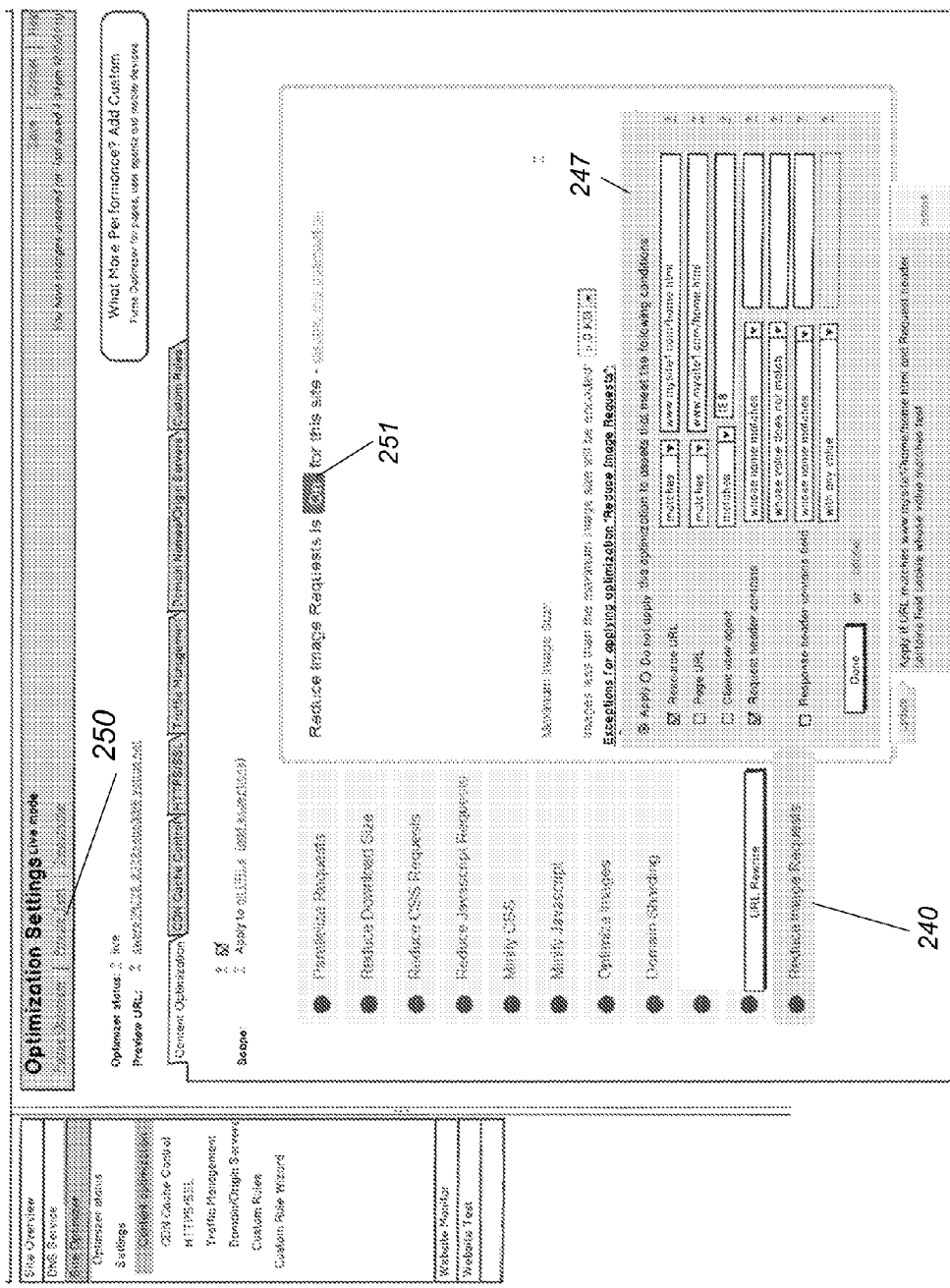
FIG. 5 depicts an example of optimizing content with the CUI of FIG. 4.

In operation, the user first selects a category that he would like to optimize, then selects specific optimization rules and then the system performs the selected optimization. In the example of FIG. 4, the category of content optimization 202 is selected and various optimization rules 230 are enabled. The selected optimization rules 230 include parallelize requests 231, Gzip 232, CSS concatenation 233, JS concatenation 234, minify HTML 235, minify JS 237, lossless image compression 238, domain sharding 239, data URI 240, safe HTML caching 241, edge caching 242, URL rewriting 244, and SPDY 245. An exception 247 is added to the parallelized request rule 231. Custom rules are added by activating the "add custom rules" function 248. In the example of FIG. 5, the "reduce image requests" rule 240 is turned on 251 and the exception 247 is specified. Exception 247 specifies that the "reduce image requests" rule 240 is applied to requests from resource URL that matches www.mysite1.com/home.html and to requests that have a header that contains field cookies whose value matches the test site. Additional exceptions may be entered by activating the "add new exception" function 248.

In addition to website performance optimization the CWO system 50 provides improved website security, improved search engine optimization (SEO) and improved user experience on mobile devices.

Website Security Optimization

The CWO system 50 provides improved website security via the following security features: TCP/IP connection attack prevention, visitor blacklisting, visit rate throttling, downtime protection, fail whale protection, form attack prevention, content security policy, security scanner, DDOS attack prevention, robot blocking, login protection, and attack dashboard, among others.

The CWO system 50 allows users to block visitors based on any information that can be obtained from the HTTP request. The system further combines in multiple ways the extracted information from the HTTP request with additional information and intelligence in order to identify and block problem visitors. Examples of the extracted information include
- TCP/IP connection parameters
- IP Address
- Browser/Device/User Agent
- Geography
- URI
- Version
- Headers
- and all combinations of the above The CWO system 50 also provides downtime protection of a website, by caching a static version of a customer's website. In the case of a customer's web server outage the system 50 serves the customer's cached web pages in a static form. This gives visitors the appearance that the site is still live. For many websites, the visitors will go to the home page and other secondary static pages before going to a page that requires server side interaction. The CWO system 50 can serve all these pages for the user even if the entire web site is down.

Furthermore, users can upload a "Fail whale" that the system 50 can serve when their site is down for maintenance, or offline for an unexpected reason or just having problems. This "fail whale" feature in combination with the "downtime protection" allows users to never appear offline in a damaging way.

Most websites have forms that allow a visitor to post data to the server. System 50 provides intelligent ways to block bad form submissions. These intelligent ways include the following:
- Spam Prevention—Block spam from a customer's blog, bulletin board and other forms.
- Email harvesting—Prevent users from pulling out bulk emails from sites.
- SQL Injection—Prevent users from injecting harmful SQL commands into forms that damage a customer's database
- XSS—Detect HTML and JavaScript posts to forms
- CSRF—Insert CSRF tokens in forms and validate on response.
- HTML Input Sanitization—For forms that allow markup (e.g. HTML in a CMS), filter/sanitize the input characters using a white list tool such as jsoup, OWASPantiSamy or OWASP java html sanitizer.

The system 50 also provides content security policy (CSP). CSP allows site owners to define a white list of 3rd party domains allowed to have external scripts (and iframes) referenced in their pages. If a script not listed in the CSP is present in a page, it indicates a successful attack. The system 50 monitors for this and alert the site owner if an illegal script is found.

System 50 also provides a security scanner feature via monitoring system 120. The security scanner provides a tool to scan a website from the outside for vulnerabilities. In one example, the security scanner is "skipfish"

System 50 also provides distributed denial of service (DDOS) attack prevention. Using the cloud infrastructure, system 50 provides customers with an infinite supply of network and processing resources to keep their real customers online and to offload any malicious requests to the cloud system.

Figure 28:
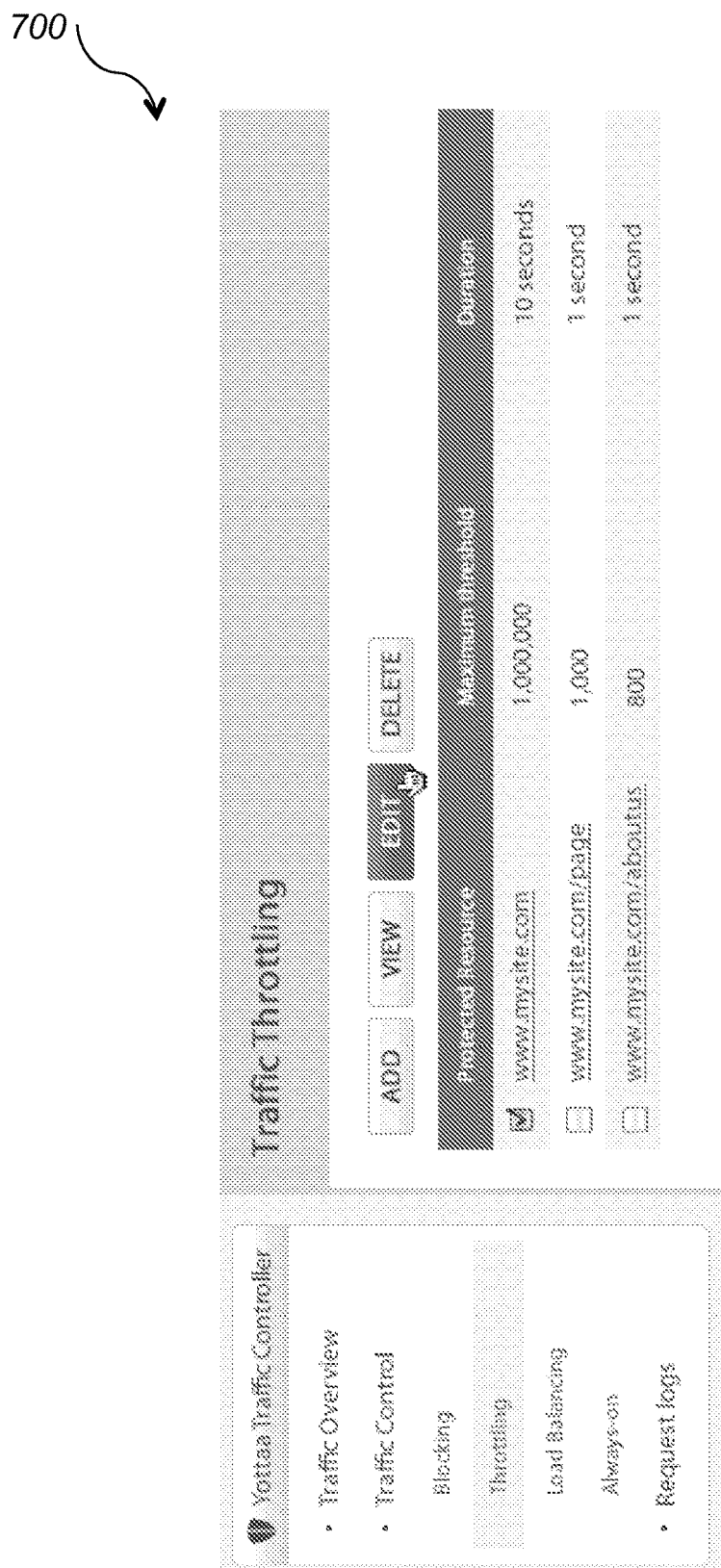
FIG. 28 depicts a screen of the UI of a CWO system used for specifying parameters for improving website security via traffic throttling.

System 50 also provides traffic blocking and throttling. FIG. 28 shows an example of how a user can specify traffic throttling. Users can use the system 50 to throttle or block web bots or serve a robots.txt that can be intelligently created, to prevent malicious robots from doing damage to their sites. Using a simple editor the user can configure the robots.txt file and the system 50 than can override the robots.txt file when it finds a malice robot. If the robot does not stop, the system 50 can then block further requests from the bot.

System 50 also provides "login protection". For customers that require login and account creation the system provides them with a set of protection capabilities to prevent malicious acts. Other security features that the system 50 provides include:
- Spam Prevention—Prevent users from creating multiple accounts
- Email address verification—Validate the email address (form and in-use) before allowing the form to be submitted
- CAPTCHA injection—Automatically add CAPTCHA ability to users forms.
- Password Throttling—Automatically delay the response to multiple password failures to prevent dictionary attacks.

Furthermore, system 50 provides users with a comprehensive "attack dashboard" that shows users analytics (type, location, user information) and ability to quickly create and clear threats from their site.

Search Engine Optimization (SEO)

System 50 also optimizes a web site for search engine bots, such as Google bots, Yahoo bots, Bing Bots, Baidu bots, among others. This search engine optimization (SEO) includes the following:

a. Delivering faster pages to search engine bots.
   i. Search engines take site speed into SEO ranking consideration nowadays. Therefore, faster pages can improve SEO
   ii. Faster pages means the same search engine bots can crawl more pages on this website within a given time window, resulting in more pages indexed and searchable;

b. Processing pages to find and report SEO problems on these pages:
   i. System 50 parses the webpages to find missing keywords, wrong keywords, improper use of HTML tags (such as H1 and H2), etc;
   ii. System 50 can transform pages to make sure proper keywords are inserted into pages, per customer configuration;

c. Search engine reporting
   i. System 50 reports detailed traffic stats from each search engine: number of crawls/frequency, length, number of pages, number of requests, etc;
   ii. Number of errors;

d. Site error reporting and auto-correction
   i. System 50 reports page crawl errors and, via custom rule, customers can specify customized error pages based on rule conditions. These error pages can be customized to improve SEO as well as UX;
e. Automatic management of site map
   i. System 50 will help build site map; Customers can edit the site map;
   ii. System 50 auto submits the site map to all search engines;

Website Optimization for Mobile Devices

For websites that are built to be displayed on desktop computers, the system 50 provides a method of transforming them into mobile device friendly websites. In one example, system 50 transforms the website so that it can be pinch-zoomable for better viewing.

Figure 27:
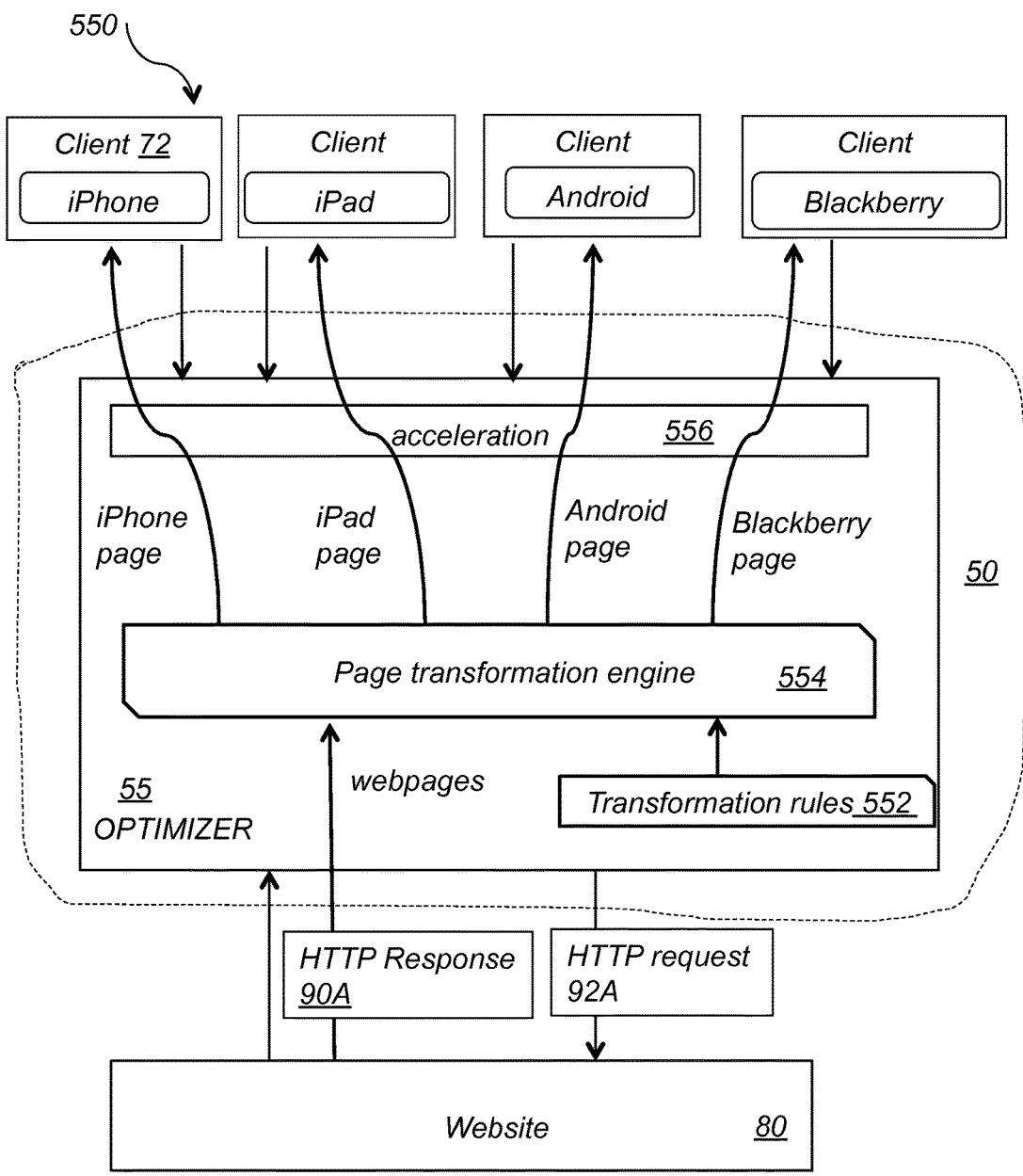
FIG. 27 is an overview block diagram of a CWO system for various mobile environments.

Furthermore, system 50 applies different set of rules if the client device is a mobile device. System 50 may also apply different set of rules for different type of mobile devices, i.e., iPhone, Tablet, Android, among others. The goal of these rules is to optimize the website in order to achieve improved mobile user experience. These rules include pre-defined rules as well as custom rules. Examples of these rules include rules of how to speed up the webpage or how to transform a webpage so that it fits better within mobile screens. FIG. 27 shows how optimizer 55 optimizes webpages for various mobile devices. As shown in FIG. 27, mobile device 72 requests a webpage from website 80. The request is routed to a node on the optimizer network 50 and processed by optimizer 55. Optimizer 55 analyzes the HTTP request to determine the mobile device profile, including its screen resolution, screen size, device capability, browser profile, HTML local storage capability, network connectivity, among others. Based on the mobile profile information gathered, optimizer 55 first checks to see if a suitable webpage for this mobile profile already exists. If so, optimizer 55 serves it directly to the mobile device. If not, optimizer 55 sends an HTTP request 90A to website 80 for this webpage. Website 80 returns the corresponding webpage as an HTTP response 92A to optimizer 55. Optimizer 55 finds optimization rules for this mobile profile, and optionally additional rules associated with this HTTP request profile, and applies these rules to process the webpage. Furthermore, optimizer 55 applies transformation rules 552 to transform the webpage into a transcoded page that is optimal for the mobile device 72, and caches the transcoded page optionally. Optimizer 55 further accelerates 556 the transcoded page and delivers it to the mobile device 72. Transformation rules 552 include one or more of the following:
1. Transcode images;
2. Compress images;
3. Insert JavaScript files for improved mobile interactivity;
4. Insert Javascript code for accessing HTML 5 local storage;
5. Exclude selected resources such as images, CSS files or Javascript files;
6. Reformat HTML pages for better viewing experience on mobile devices;
7. Select certain content blocks from the webpage, reformat them into a new page layout as specified in the transformation rule;
8. Select certain content blocks from the webpage, mash them up with content and data from other sources such as external websites or data feed, format them into a new page layout customized for the mobile device;
9. Redirect to a mobile specific URL;
10. Display a pre-defined page;

Further, the present invention provides an iterative process to tune website optimization for mobile devices. The iterative process includes "Test", "Visualize" and "Optimize" in a closed loop feedback cycle. A customized user interface is provided to support this iterative process.

Website Testing

Figure 8:
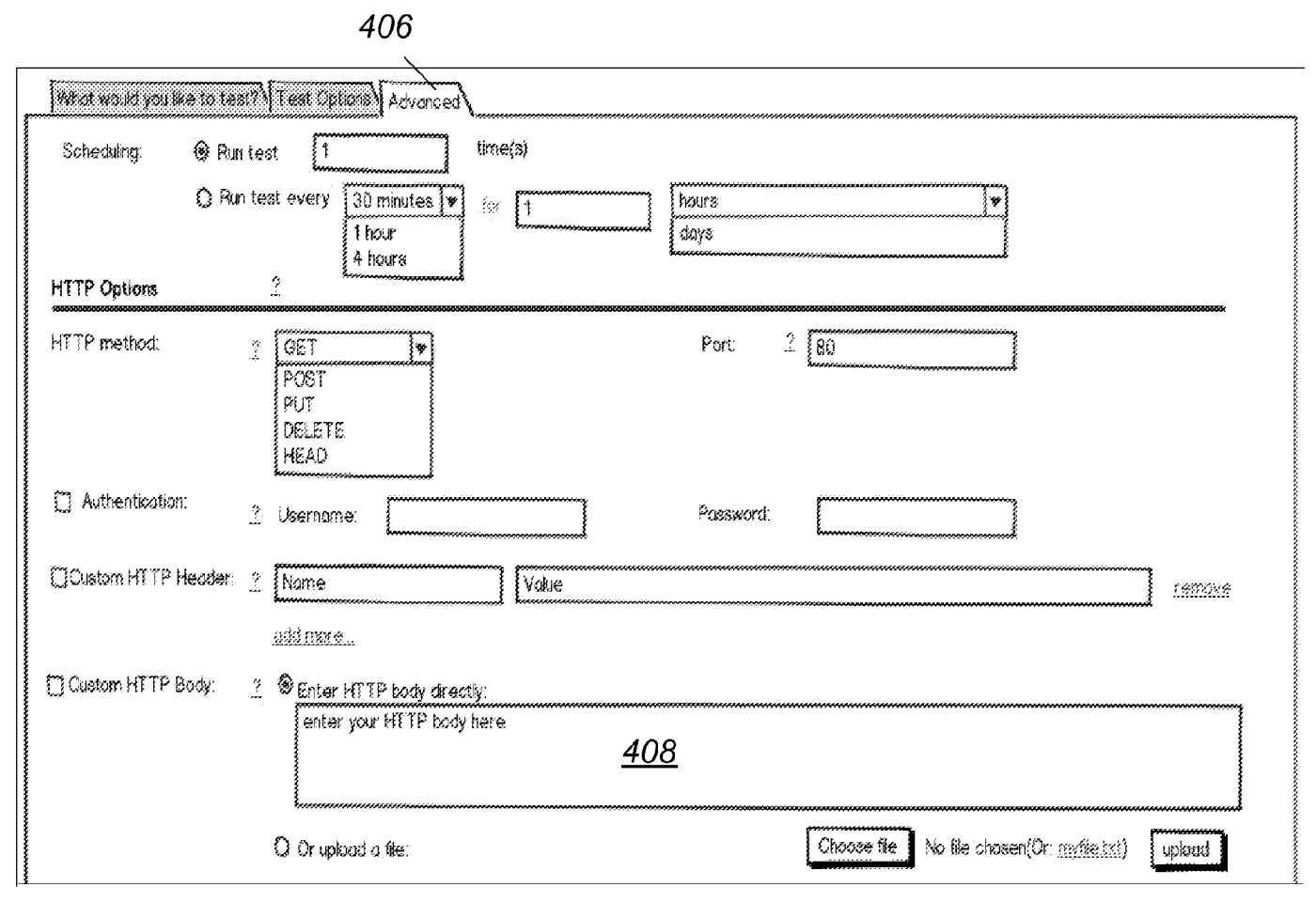

The next step of the closed loop website optimization process is to test the performance of the optimized website (310), with the tester 42, as shown in FIG. 3A and FIG. 3B. The CWO system 50 supports private testing of the website. Private testing allows a user to make changes to website optimization settings and to test the resulting website in a private session, without interrupting or impacting the live website. Private testing is initiated by the user activating the private testing function 250, as shown in FIG. 5. There are two options to run a private test: from the user's own browsers or from the testing agents that run in the cloud. If the user chooses to run private test using testing agents in the cloud, the user will be guided to specify the test options, shown in FIG. 6-FIG. 8. The test options include the following:
a. The type of test to be conducted:
   i. Real browser testing: This is to launch a real browser to load and execute the web page from different geographic locations via different last mile network connectivity. Further this includes the following options:
      1. Multi-browser testing: test the website from many different browsers;
      2. Multi-geography testing: test the website from many different geographic locations
      3. Multi connectivity testing. test the website from many different last mile networks, such as Cable, DSL, FIOS, T1/T3, etc.
   ii. Web Transaction Testing: this is to launch a real browser to load and execute a transaction script to test the functionality and performance of the website. This also includes the following options:
      1. Multi-browser testing: test the website from many different browsers;
      2. Multi-geography testing: test the website from many different geographic locations
      3. Multi connectivity testing. test the website from many different last mile networks, such as Cable, DSL, FIOS, T1/T3, etc.
   iii. HTTP/API Testing: this is to launch an HTTP agent to test an HTTP server or service. It includes the following options:
      1. Multi-geography testing: test the website from many different geographic locations
      2. Multi connectivity testing. test the website from many different last mile networks, such as Cable, DSL, FIOS, T1/T3, etc.
   iv. Mobile Testing: This is to test a website or an HTTP service from a mobile device such as Android phone, Android Tablet, iPad, and iPhone.
b. The duration of the test
   i. Run the test only once
   ii. Run the test multiple times (repeat)
   iii. Perform a schedule test: run the test periodically during certain duration;
c. Select the test browsers, locations, last mile connectivity, and/or mobile devices.
d. Configure additional test parameters such as HTTP request parameters, cookie, HTTPS, port number, screen capture options, among others.

Figure 6:
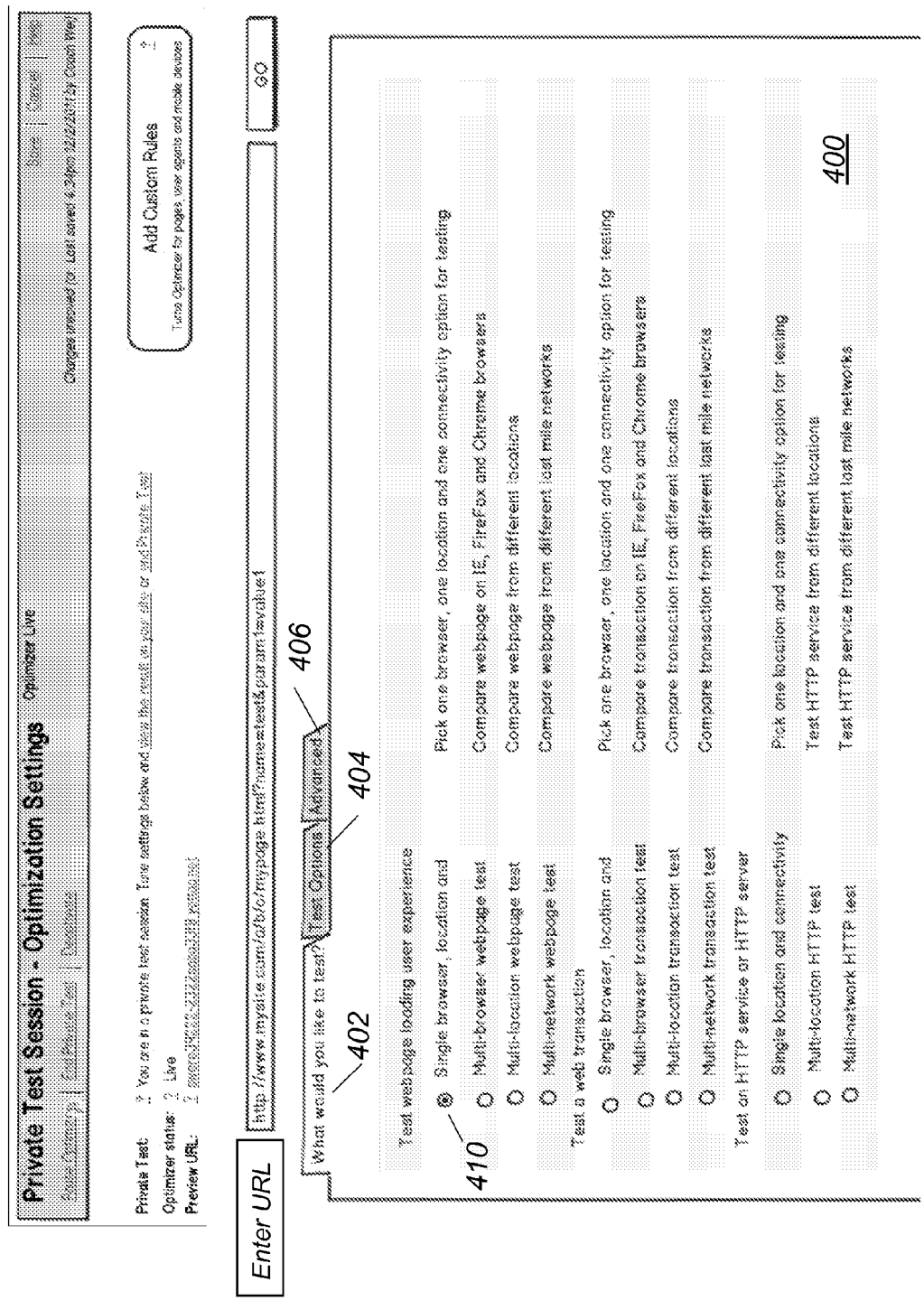
FIG. 6 depicts a screen of the tester of FIG. 3A for selecting what optimization objective/function to test.

Referring to FIG. 6, in a private test session 400, the user specifies what he would like to test 402, the test options 404 and the advanced test settings 406. In the example of FIG. 6, the "webpage loading user experience" 408 is tested for a single browser location 410. The test options 404 are displayed in FIG. 7. In this example, the selected browser is Internet Explorer 8.0, the location is Washington D.C. and the last mile connectivity for a T3/T1 connection is tested. The test is run one time, the HTTP GET function is tested, the port is 80 and the HTTP request is entered in field 408, as shown in the advanced test settings screen in FIG. 8.

Besides running private test using testing agents in the cloud, the user can also test webpages from the website directly from his own browser in a private test session.

Regardless whether the testing is conducted from local browsers or using agents in the cloud, in a private test session, the user can make optimization settings changes, test the result from these changes, without changing the optimization behavior for other web visitors. This is achieved by separating the live optimization settings from the private test session settings, and applying different settings for different visitors. More specifically:

1. When the user initiates a private test session, a copy of the current optimization settings ("live optimization settings") is created for this private test session ("Private Test session settings");
2. When the user makes optimization settings changes, these changes are saved to the newly created copy of optimization settings ("private test session settings");
3. For HTTP requests/responses that are part of the private test session, the private test session settings are applied. For all other HTTP requests/responses, the live optimization settings are applied;

During request/response processing, the optimization system (Optimizer) inspects HTTP requests and determines which settings should be applied. If the HTTP request belongs to a private test session, the associated private test session settings are applied. Otherwise the live optimization settings are applied.

One example to differentiate the private test session from all other sessions is to set up a special browser cookie for the private test session. When a user starts a private test session, the private test session startup page sets the private test session cookie first. After that, when this user loads any other web pages from this test website into the browser, the associated private test session cookie will be delivered to the Traffic Processing System 100, as shown in FIG. 2, as part of every HTTP request. TPS 100 inspects the HTTP request. If there is a special private test session cookie, it applies the private test session settings. Otherwise it applies the live settings. When the user clicks "End Private Test" button, the private test session cookie is cleared from the browser, and optionally, at the user's permission, the private test session settings are either saved as live optimization settings or discarded.

Website Test Visualization and Processing

Figure 9:
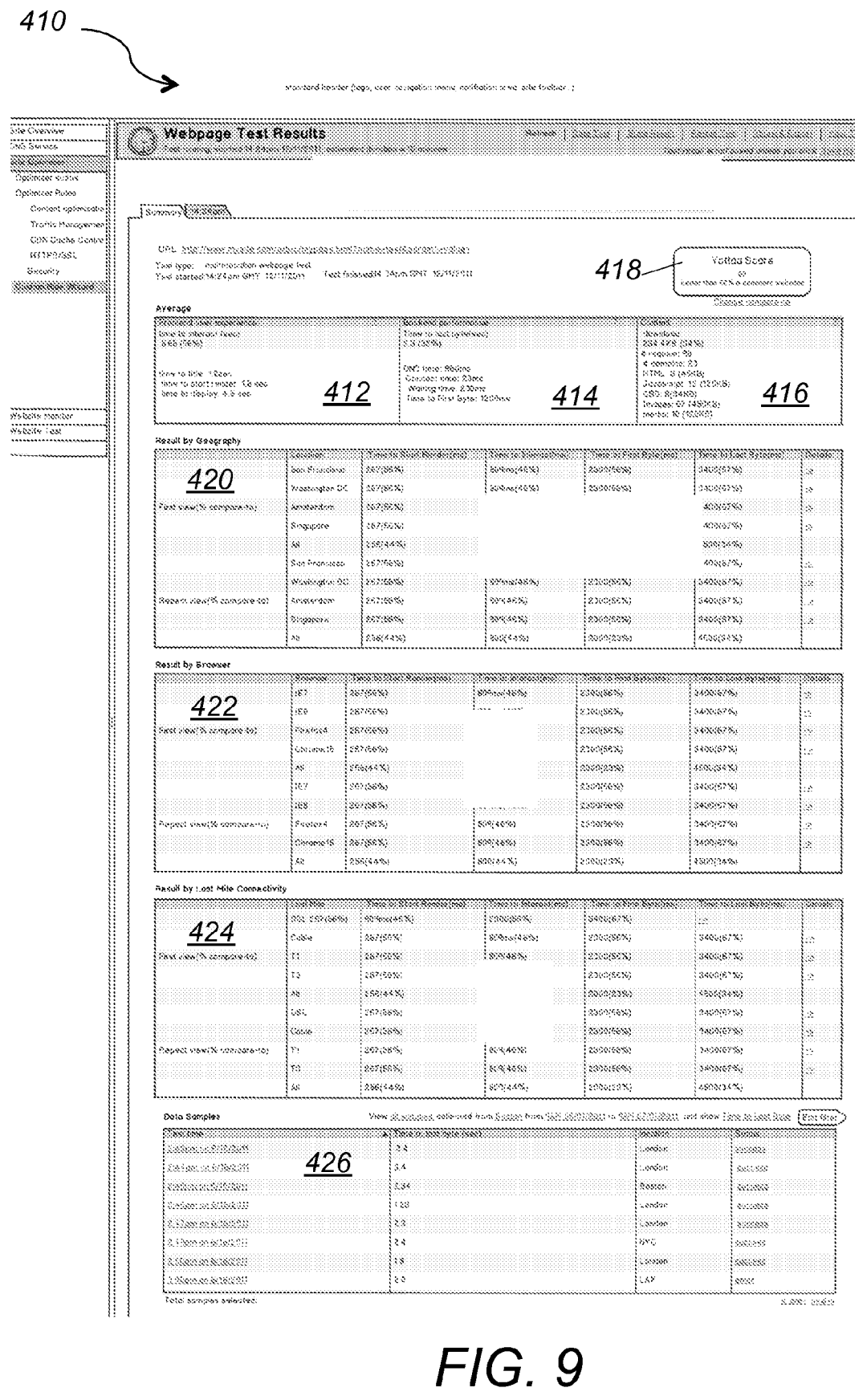
Figure 10:
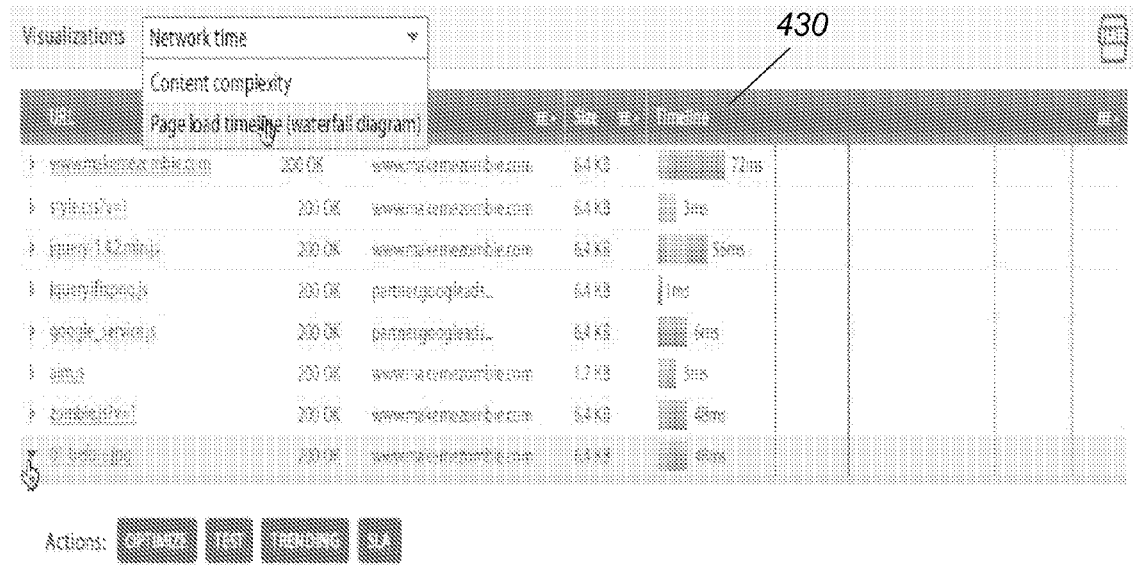
FIG. 10 depicts a visualizer screen for selecting specific visualizations of the test results.

After testing, the user visualizes the results with the visualizer 46 then and has the option to repeat the optimization process until a desired objective is achieved. As shown in FIG. 3B, the next step of the closed loop website optimization process 300 is to visualize the test results (312). The webpage test results are summarized and displayed in the screen shown in FIG. 9. The test results summary includes the average front-end experience 412, average back-end experience 414, and average content 416. The test results summary also includes the results by geography 420, by browser type 422, by last mile connectivity 424 and some data samples 426. An overall test score 418 is also shown. Visualizations of specific results may also be displayed. In the example of FIG. 10, a waterfall diagram 430 of the page load timeline is displayed. A waterfall diagram is a diagram that displays data generated cumulatively and sequentially across a process. A comparison of a waterfall diagram displaying data between a before and after an optimization process provides insights in the performance of a webpage.

Figure 11:
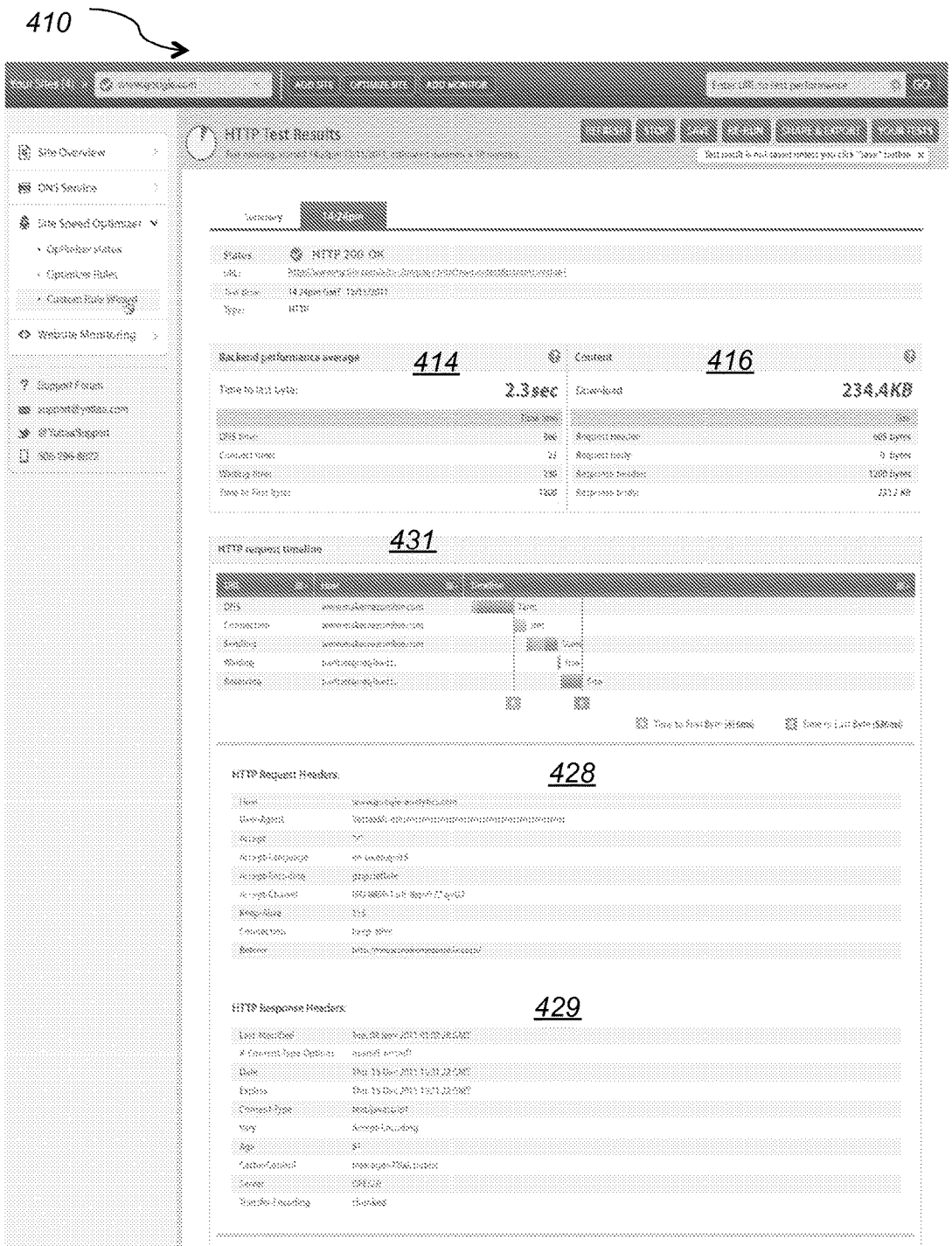
FIG. 11 depicts an example of a visualizer screen displaying the test results.
Figure 12:
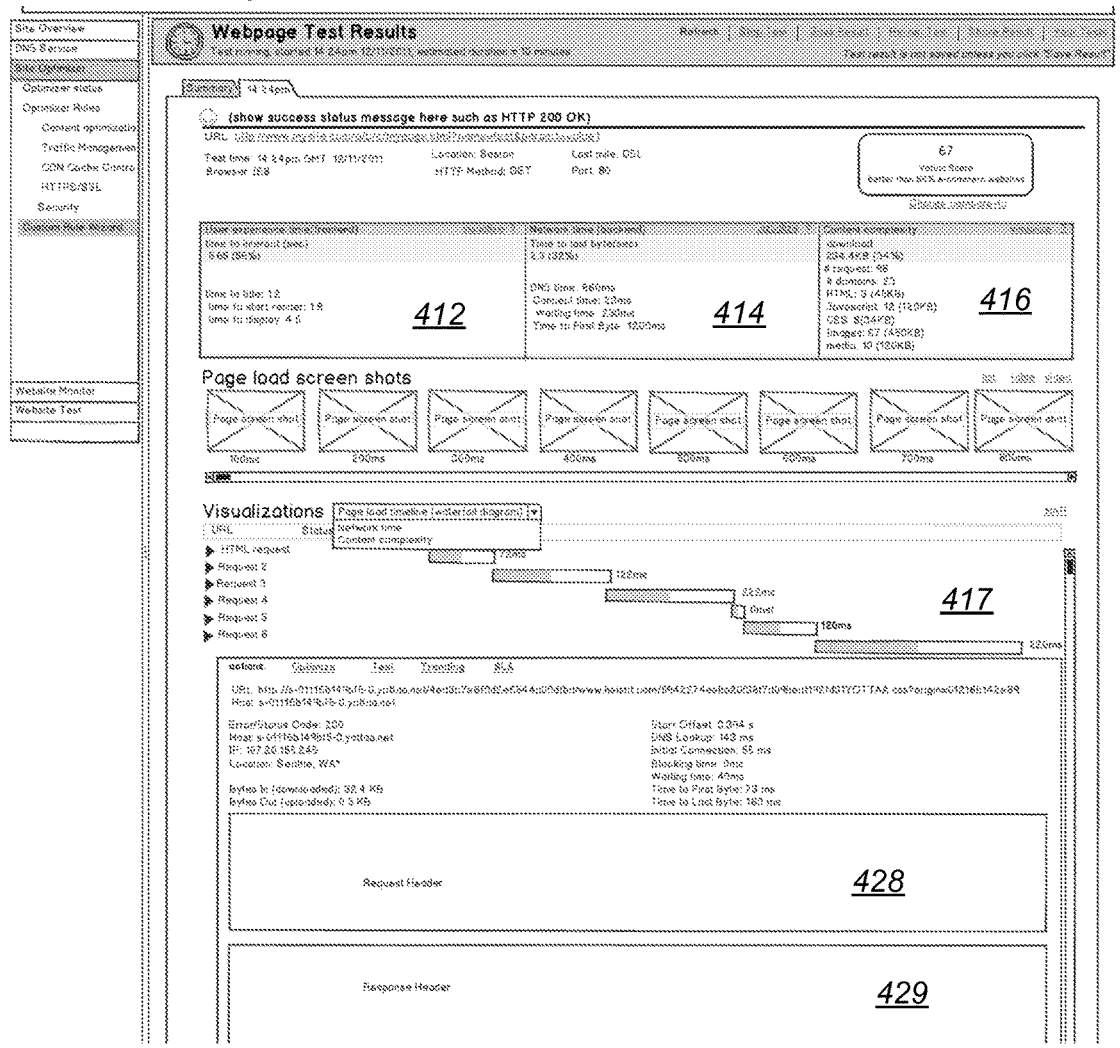
FIG. 12 depicts another example of a visualizer screen displaying the test results.
Figure 13:
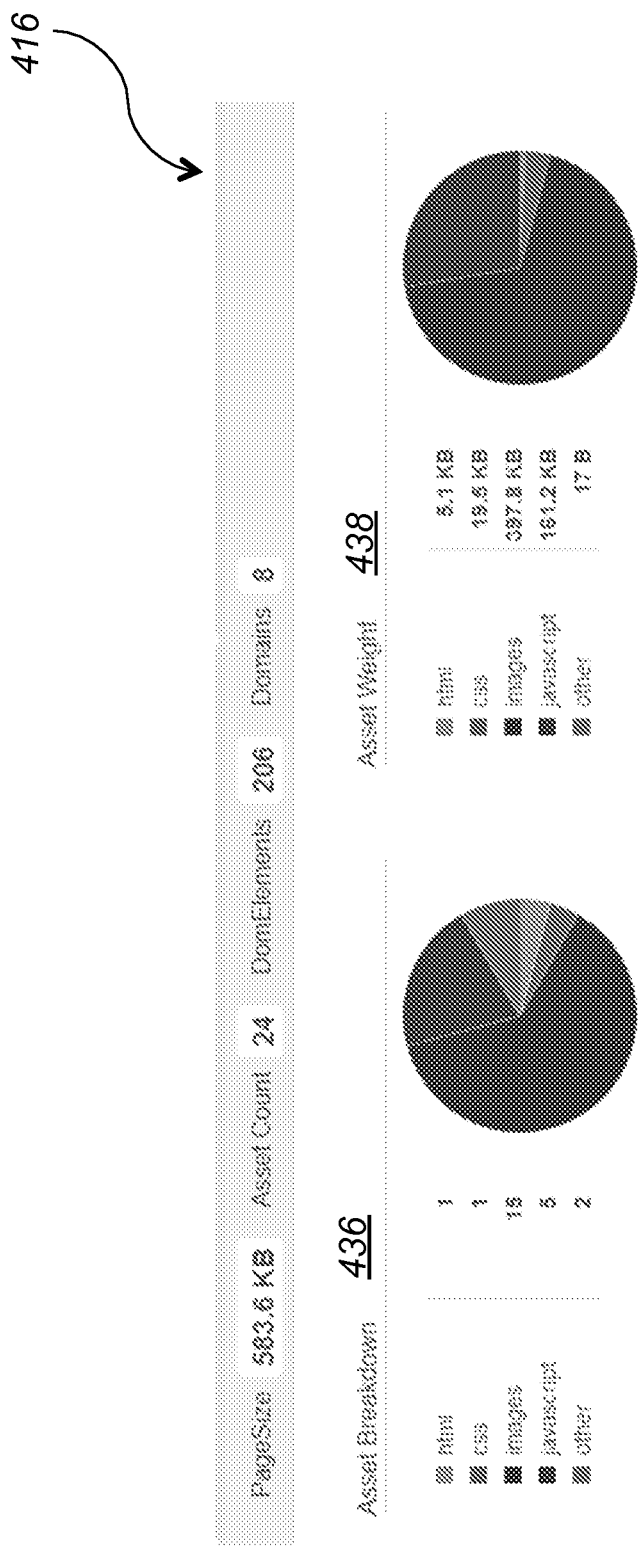
FIG. 13 depicts pie diagrams of specific asset breakdown and weights based on testing of a webpage with the CWO system of this invention.
Figure 15:
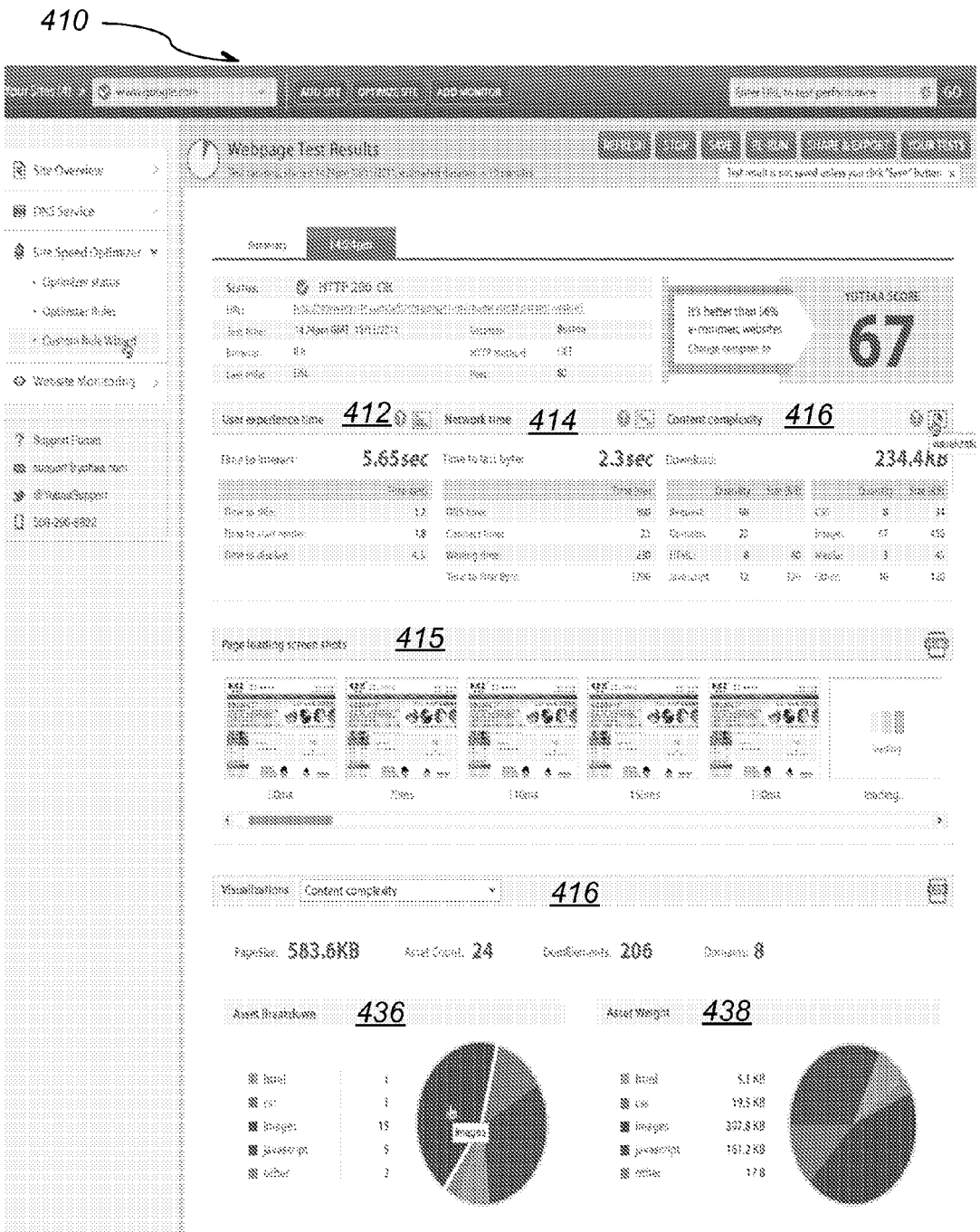
FIG. 15 is a screen depicting pie diagrams of the webpage content complexity at different moments of loading.

In the example of FIG. 11, the test results summary includes the back-end performance 414, content 416, the waterfall diagram for the HTTP request timeline 431, the HTTP request headers 428 and the HTTP response headers 429. In the example of FIG. 12, the test results summary includes the user frontend experience 412, backend network performance 414, content complexity 416, page load screen shots 415, and visualizations of the waterfall diagram for the page load timeline 417, the HTTP request headers 428 and the HTTP response headers 429. FIG. 13 depicts a visualization of the content complexity 416 in the form of pie diagrams. The pie diagrams display the asset breakdown 436 and size (or weight) 438 for a webpage. The webpage has a size of 583.6 KB and includes 24 assets, 206 domain elements and 8 domains. The webpage assets include one html, one css, 15 images, 5 javascript and 2 other. The html asset has a size (weight) of 5.1 KB, the css has a size of 19.5 KB, the images have a size of 397.8 KB, the javascript has a size of 162.2 KB and other assets have a size of 17 KB. In the example of FIG. 14, the test results summary includes the user frontend experience 412, backend network performance 414, content complexity 416, overall score 418, page load screen shots 415, and visualizations of the waterfall diagram for the page load timeline 417. In the example of FIG. 15, the test results summary includes the user frontend experience 412, backend network performance 414, content complexity 416, overall score 418, page load screen shots 415, and visualizations of the content complexity pie diagrams 436, 438. Based on the test results and their analyses, various problem areas (bottlenecks) of the website performance are identified, and then actions are taken to remove these causes of the problem areas.

As was mentioned above, the sequence and timing of how a webpage is processed inside a browser is recorded during the test and then visualized in a waterfall diagram. The waterfall diagram shows precisely how a web browser would process this webpage, and the timing and duration of executing each resource on that webpage. From the waterfall diagram, the user can sort and analyze which resource is the bottleneck and then the user can expand that resource, and take actions immediately to remove the bottleneck. The actions include:

a. Optimize: optimize this resource;
b. Test: perform another set of testing for this resource to help identify whether the problem is consistent;
c. Trending: look at the historical data for this resource to help identify whether the problem is consistent;
d. SLA: specify the SLA around this resource and SLA-related rules
e. Secure: specify security requirements around this resource and related rules In the next steps of the closed loop iterative web optimization process, the resource is optimized (308), tested (310) and visualized (312) again, as shown in FIG. 3B. From the test result page, the user identifies a resource that creates a bottleneck and immediately takes actions to address the bottleneck. "Optimize" is one of the actions when performance is the concern. When the user clicks "Optimize", the custom rule wizard 214 is launched to guide the user in the optimization of this particular resource. This custom rule wizard 214 provides means for the user to select techniques that are applicable to this type of resource and configure how these techniques should be applied. As a result of this action, a custom rule is created. Table 1 lists typical custom rule conditions and actions for different types of HTTP resources.

For each custom rule, the user specifies a set of rule conditions and a rule action. The typical rule conditions are combinations of the following:
1. The resource URL must match a certain pattern;
2. The page URL must match a certain pattern;
3. The client user agent must match a certain pattern (or must not match);
4. The HTTP request header must contain a specific field (based on field name matching plus optional field value matching)
5. The HTTP response header must contain a specific field based on field name matching plus optional field value matching.

Figure 18:
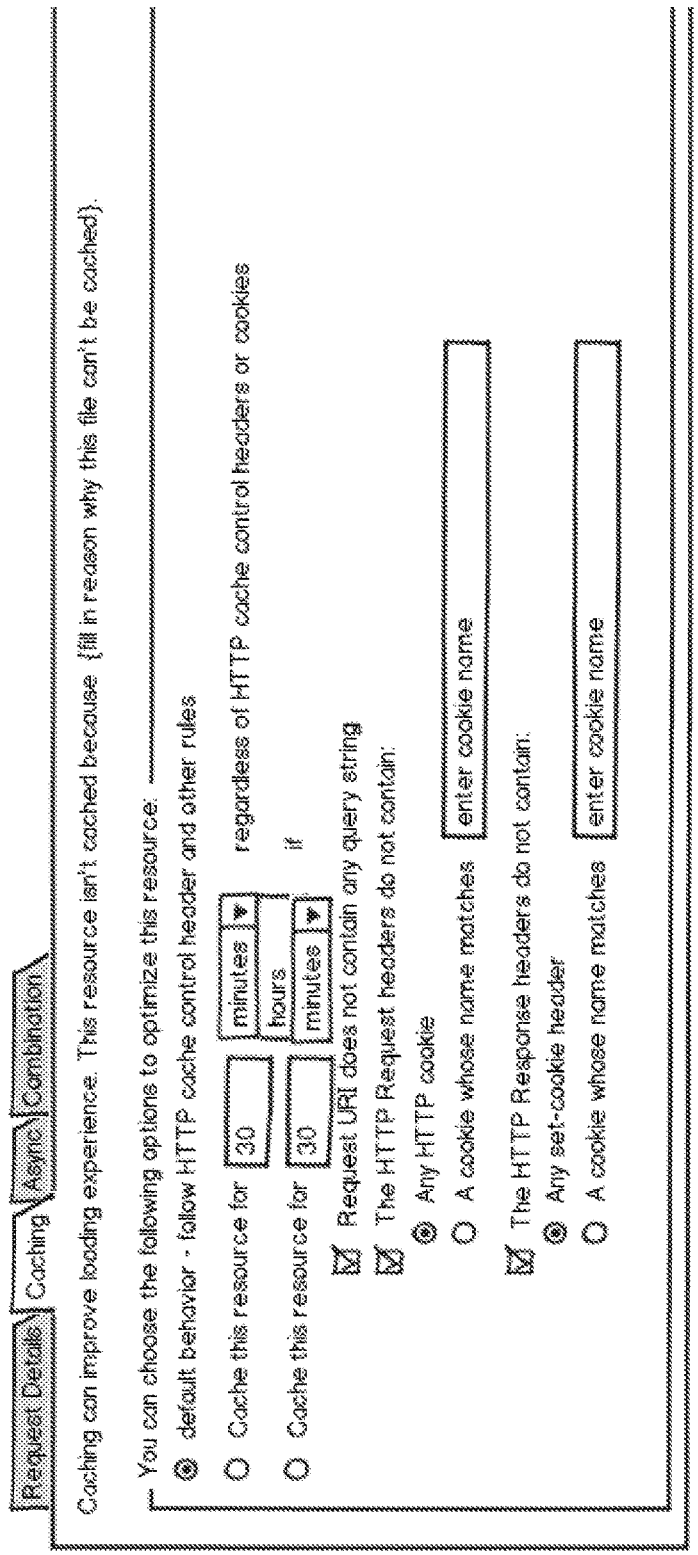
FIG. 18 depicts a UI for selecting parameters for asset optimization via smart caching.
Figure 19:
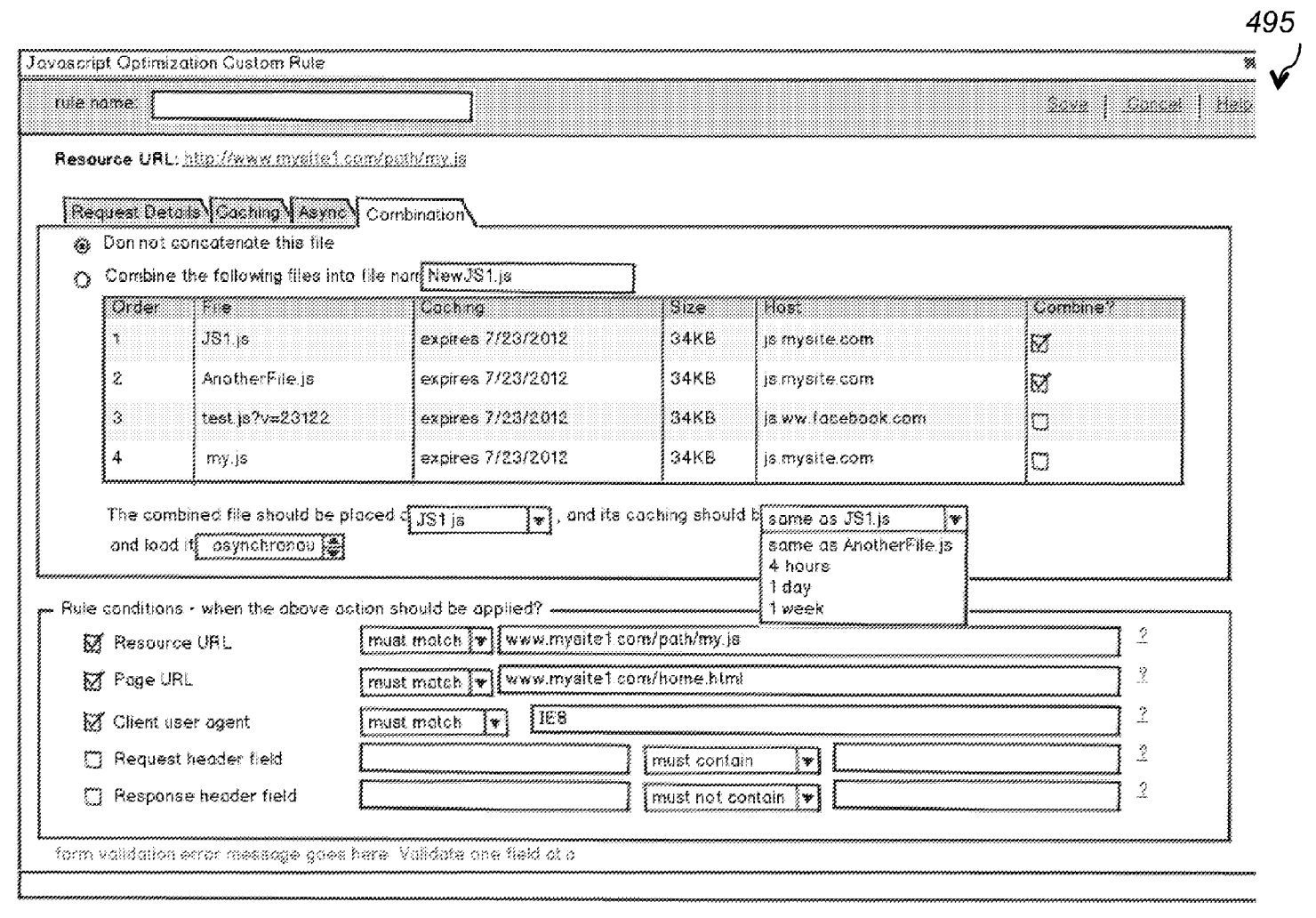

FIG. 16 depicts a common user interface for configuring rule conditions for the above mentioned combinations. FIG. 17-FIG. 19 depict user interfaces for adding custom rules for optimizing JavaScript resources. In particular, FIG. 17 depicts a user interface for adding custom rules for JavaScript optimization via asynchronous loading. FIG. 18 depicts a user interface for adding custom rules for JavaScript optimization via smart caching. FIG. 19 depicts a user interface for adding custom rules for JavaScript optimization via JavaScript combination. FIG. 20 depicts a user interface for adding custom rules for optimizing css resources via css combination. FIG. 21-FIG. 23 depict user interfaces for adding custom rules for optimizing image resources. In particular, FIG. 21 depicts a user interface for compressing an image. FIG. 22 depicts a user interface for right sizing an image. FIG. 23 depicts a user interface for transcoding an image.

For resources with different mimetypes, different techniques can be applied via the CUI 52. For example, for an HTML resource, the only technique available is caching. For JavaScript files, the techniques available include caching, combination and asynchronous loading. Users may add specific custom rules by picking a specific optimization technique for a specific resource. Some of these techniques are mutually exclusive. For example, if a user configured a Javascript file to be combined, then it can be configured for "async" or "caching".

Figure 24:
FIG. 24 depicts a UI for selecting parameters for asset optimization via caching.

Asset caching is an optimization technique that applies to all static assets. The default behavior is to follow HTTP cache control header for any asset whose mimetype belongs to the list of mimetypes considered to be cache-able. However, not all HTTP servers specify HTTP cache control headers. Some HTTP cache control headers may not make sense for some assets. So we are providing the user a way to specify caching behavior beyond HTTP cache control headers. The following parameters are configurable from the caching user interface, shown in FIG. 18.
Whether Asset Caching is turned on or off?
What mimetypes can be considered for asset caching?
For these mimetypes, whether to follow HTTP cache control header (this is the default behavior)
For these mimetypes, if the user specifies not to follow HTTP cache control headers or if an asset does not have HTTP cache control header available what are the conditions to cache this asset. The conditions include:
Whether the HTTP method must be HTTP GET (default). If the user un-checks this, we will do cache checking for requests/responses with other HTTP methods too;
Whether the HTTP request URI can have query string. The default is to exclude any URI with a query string from the consideration of caching;
Whether the HTTP request header can contain cookie, or a specific cookie;
Whether the HTTP response header can contain "set-cookie" or a specific cookie;
How long this asset should be cached
Lastly, the user can add Exceptions to this asset caching rule
The user can specify "always apply caching" to HTTP requests/responses that fit certain conditions;
The user can specify "always exclude HTTP requests/responses" that fit certain conditions from the consideration of caching. The conditions from the above 2 include:
Resource URL
Page URL
User Agent
Request Header
Response Header An example of a caching user interface for adding or editing exceptions is shown in FIG. 24. When the user starts the custom rule wizard 214 to add a new Custom Caching Rule for an asset, the wizard shows whether this asset is currently cached or not. If it is cached, it shows why it is cached (it will be HTTP cache control header, the default asset caching rule, or default safe HTML caching rule), and allows the user to flush the cache for this asset. If the asset is not cached currently, it shows why it is not cached (the reason would be the HTTP cache header, default caching rules, etc). Furthermore, the custom rule wizard 214 allows the user to specify the rule action. In one example, the custom rule wizard allows the user to specify how an asset should be cached: (i.e., follow HTTP cache control or other caching rules (default), cache it for a certain duration no matter what, or cache it for a certain duration if a certain conditions are met). Furthermore, the custom rule wizard 214 allows the user to specify the conditions for the above rule action to take place. The conditions are based on Resource URL, page URL, Client user agent, HTTP Request header and HTTP response headers. Once the user specifies the above, a new custom caching rule will be created. Any http request/response that meets the above rule conditions will have the above rule actions applied. The asset may be an image, HTML, CSS, JavaScript, among others. FIG. 25 depicts the user interface for creating a new custom caching rule for a css resource.

A user can always view or edit existing custom rules, including custom caching rules. Each custom rule is bound to a specific optimization technique. So for different techniques, the user interface (UI) to view or edit the custom rules is different. However, for the same technique, the UI to view or edit a custom rule is the same regardless of the mimetype. An example of a UI to view or edit a custom caching rule is shown in FIG. 26.

Several embodiments of the present invention have been described. Nevertheless, it will be understood that various modifications may be made without departing from the spirit and scope of the invention. Accordingly, other embodiments are within the scope of the following claims.

What is claimed is:
1. A system for tuning context specific optimization of a website, the system comprising:
one or more processors for implementing an intermediary device between a server of a website and one or more client devices, the intermediary device configured to:

test and measure website properties using hypertext transfer protocol (HTTP) requests from the one or more clients and HTTP responses from the server, against an optimization objective for the website, and to produce test results according to the measured website properties;

visualize the test results to identify a problem area in the website's performance, presenting options to address the problem area, and enabling actions for adjusting optimization settings according to at least one of the presented options; and apply the adjusted optimization settings to one or more HTTP messages between the server and the one or more client, produce updated test results for visualization, and provide iterative adjustments of the optimization settings responsive to the visualization, until a desired optimization result of the website is achieved.

2. The system of claim 1, wherein the intermediary device is further configured to process a HTTP response from the server by conditionally inserting a resource into the HTTP response or removing a resource from the HTTP response, and providing the processed HTTP response to one of the one or more clients.

3. The system of claim 2, wherein the inserted or removed resource comprises one or more of: a Javascript code snippet, a web widget, an HTML code snippet, an image, a flash video, or a third party tag.

4. The system of claim 1, wherein the intermediary device is configured to apply the adjusted optimization settings which comprise one or more of service level agreement (SLA) settings, security related settings, or geography related settings.

5. The system of claim 1, wherein the intermediary device is configured to maintain a test website session separate from at least one live website session, and apply the adjusted optimization settings to the test website session while maintaining pre-existing optimization settings for the at least one live website session.

6. The system of claim 1, wherein the intermediary device is configured to test and measure website properties comprising at least one of: website performance, security, search engine ranking or user experience.

7. The system of claim 1, wherein the intermediary device is configured for visualizing the test results comprising at least one of: a HTTP request timeline, a HTTP response timeline, a timeline for loading a web page of the website, or complexity of the web page's content.

8. The system of claim 1, wherein the intermediary device is configured for visualizing a timeline for loading resources of a web page of the website, to identify a resource that has a slower load time than that of another of the resources, and providing options for adjusting the optimization settings to improve the load time of the resource.

9. The system of claim 1, wherein the updated optimizing settings specify a sequence and timing for processing specific resources of a web page of the server.

10. The system of claim 1, wherein the intermediary device is configured to apply the adjusted optimization settings for a specific context, the specific context comprising one of: browser type, client device type, search engine type, network type, or bot type.

11. A method for tuning context specific optimization of a website, the method comprising:

measuring, by testing component of an intermediary between a server of a website and one or more client devices, website properties using hypertext transfer protocol (HTTP) requests from the one or more clients and HTTP responses from the server, against an optimization objective for the website, to produce test results according to the measured website properties, the intermediary comprising one or more processors;

visualizing, via a visualizing component of the intermediary, the test results to identify a problem area in the website's performance, and to receive one or more options for addressing the problem area via adjustment of optimization settings; and applying, by an optimizing component of the intermediary in communication with the testing component and the visualizing component, the adjustment of the optimization settings to one or more HTTP messages between the server and the one or more client, to produce updated test results for visualization, and to provide iterative adjustments of the optimization settings responsive to the visualization, until a desired optimization result of the website is achieved.

12. The method of claim 11, wherein applying the adjustment of the optimization settings comprises processing a HTTP response from the server by conditionally inserting a resource into the HTTP response or removing a resource from the HTTP response, and providing the processed HTTP response to one of the one or more clients.

13. The method of claim 12, wherein the inserted or removed resource comprises one or more of: a Javascript code snippet, a web widget, an HTML code snippet, an image, a flash video, or a third party tag.

14. The method of claim 11, wherein applying the adjustment of optimization settings comprises adjusting, adding or removing one or more service level agreement (SLA) settings, security related settings, or geography related settings.

15. The method of claim 11, further comprising maintaining a test website session separate from at least one live website session, and applying the adjustment of optimization settings to the test website session while maintaining pre-existing optimization settings for the at least one live website session.

16. The method of claim 11, wherein measuring website properties comprises measuring at least one of: website performance, security, search engine ranking or user experience.

17. The method of claim 11, wherein visualizing the test results comprises visualizing at least one of: a HTTP request timeline, a HTTP response timeline, a timeline for loading a web page of the website, or complexity of the web page's content.

18. The method of claim 11, wherein visualizing the test results comprises visualizing a timeline for loading resources of a web page of the website, to identify a resource that has a slower load time than that of another of the resources, and provide options for adjusting the optimization settings to improve the load time of the resource.

19. The method of claim 11, wherein the adjustment of the optimizing settings provides adjusted optimizing settings that specify a sequence and timing for processing specific resources of a web page of the server.

20. The method of claim 11, further comprising applying the adjustment of the optimization settings for a specific context, the specific context comprising one of: browser type, client device type, search engine type, network type, or bot type.

* * * * *